US008145448B2

(12) United States Patent
Vincenzini

(10) Patent No.: US 8,145,448 B2
(45) Date of Patent: Mar. 27, 2012

(54) SYSTEM AND PROCESS FOR CHARTING AND DISPLAYING THE TIME AND POSITION OF CONTESTANTS IN A RACE

(76) Inventor: Fernando Vincenzini, Glen Cove, NY (US)

( * ) Notice: Subject to any disclaimer, the term of this patent is extended or adjusted under 35 U.S.C. 154(b) by 0 days.

(21) Appl. No.: 11/614,848

(22) Filed: Dec. 21, 2006

(65) Prior Publication Data

US 2007/0100577 A1   May 3, 2007
US 2012/0046903 A9   Feb. 23, 2012

Related U.S. Application Data

(63) Continuation-in-part of application No. 11/126,736, filed on May 11, 2005, and a continuation-in-part of application No. 10/860,867, filed on Jun. 3, 2004, and a continuation-in-part of application No. PCT/US02/38459, filed on Dec. 3, 2002, now abandoned, and a continuation-in-part of application No. 10/860,867, filed on Jun. 3, 2004, which is a continuation-in-part of application No. PCT/US02/38459, filed on Dec. 3, 2002, now abandoned.

(60) Provisional application No. 60/752,762, filed on Dec. 21, 2005, provisional application No. 60/577,430, filed on Jun. 3, 2004, now abandoned, provisional application No. 60/336,620, filed on Dec. 3, 2001, now abandoned, provisional application No. 60/336,620, filed on Dec. 3, 2001, now abandoned.

(51) Int. Cl.
    G01C 9/00  (2006.01)
(52) U.S. Cl. .......... 702/150; 702/127; 702/158; 463/58; 463/59; 463/60
(58) Field of Classification Search .......... 702/142, 702/150–155, 158, 176, 182–185, 188; 463/58–60
See application file for complete search history.

(56) References Cited

U.S. PATENT DOCUMENTS 3,166,314 A * 1/1965 Weinstein ........................ 472/86
3,546,696 A * 12/1970 Gunderman et al. ............ 342/44
3,690,666 A * 9/1972 Seitz .............................. 273/246
3,714,649 A    1/1973 Brouwer et al.
3,781,529 A   12/1973 Abramson et al.
3,795,907 A    3/1974 Edwards
3,818,479 A * 6/1974 Ledbetter ....................... 342/423

(Continued)

OTHER PUBLICATIONS

Wester's II New Riverside University Dictionary, 1984, Riverside Publishing Company, ISBN 0-395-33957-X, p. 381.*

(Continued)

Primary Examiner — Drew A Dunn
Assistant Examiner — Mischita Henson
(74) Attorney, Agent, or Firm — Collard & Roe, P.C.

(57) ABSTRACT

A system and a process for determining the timing and position of contestants on a track. This system comprises at least one directional antenna in communication with at least one competitor communication device that can be coupled to each contestant. A remote base station, is in communication with the positioning device, wherein the positioning device determines a contestant time as the contestant passes the projected field and also determines the position of the contestant in relation to an inside guide such as a rail. There is also a process which includes attaching at least one competitor communication device on at least one contestant, starting a race, and then recording the position and time for each contestant and transmitted from the competitor communication device to a remote base station.

38 Claims, 17 Drawing Sheets

U.S. PATENT DOCUMENTS

| | | | |
|---|---|---|---|
| 3,946,312 A | | 3/1976 | Oswald et al. |
| 4,142,680 A | | 3/1979 | Oswald et al. |
| 4,200,287 A | | 4/1980 | Ryan et al. |
| 4,274,076 A | | 6/1981 | Hermanns et al. |
| 4,498,666 A | * | 2/1985 | McCallum .................. 472/86 |
| 4,571,698 A | | 2/1986 | Armstrong |
| 4,774,679 A | | 9/1988 | Carlin |
| 4,857,886 A | * | 8/1989 | Crews .................. 340/323 R |
| 4,874,177 A | | 10/1989 | Girardin |
| 5,089,960 A | * | 2/1992 | Sweeney, Jr. .................. 463/6 |
| 5,091,895 A | * | 2/1992 | Chatwin et al. .................. 368/6 |
| 5,138,550 A | | 8/1992 | Abraham et al. |
| 5,175,480 A | | 12/1992 | McKeefery |
| 5,194,843 A | * | 3/1993 | Jones et al. .............. 340/323 R |
| 5,240,459 A | * | 8/1993 | Herbert .................. 472/86 |
| 5,435,553 A | * | 7/1995 | Arima et al. .................. 463/6 |
| 5,436,611 A | * | 7/1995 | Arlinghaus, Jr. .......... 340/323 R |
| 5,513,103 A | | 4/1996 | Charlson |
| 5,737,280 A | * | 4/1998 | Kokubo .................. 368/2 |
| 5,812,049 A | | 9/1998 | Uzi |
| 5,844,861 A | | 12/1998 | Maurer |
| 6,072,751 A | | 6/2000 | Kirson |
| 6,104,864 A | | 8/2000 | Kondo et al. |
| 6,325,721 B1 | | 12/2001 | Miyamoto et al. |
| 6,567,038 B1 | * | 5/2003 | Granot et al. .................. 342/44 |
| 6,611,755 B1 | * | 8/2003 | Coffee et al. .................. 701/213 |
| 2001/0015707 A1 | * | 8/2001 | Oby .................. 343/890 |
| 2002/0152040 A1 | | 10/2002 | Majoe |
| 2003/0073405 A1 | | 4/2003 | Chen |
| 2003/0078087 A1 | * | 4/2003 | Kojima et al. .................. 463/6 |
| 2004/0006445 A1 | * | 1/2004 | Paek .................. 702/178 |
| 2004/0017732 A1 | | 1/2004 | Kishida |
| 2004/0243262 A1 | * | 12/2004 | Hofmann .................. 700/91 |

OTHER PUBLICATIONS

Ildado.com, Horse Racing glossary, ildado.com, Mar. 3, 2011, www.idado.com/horse_racing_glossary03.html, all pages.*

Office Action from U.S. Appl. No. 10/860,867 (Parent Application). Office action dated Nov. 16, 2007 Examiner is hereby notified that the following applications are in the same family: U.S. Appl. No. 60/752,762; U.S. Appl. No. 11/126,735; U.S. Appl. No. 60/577,430; U.S. Appl. No. 10/860,867; PCT/US02/38459; U.S. Appl. No. 60/366,620; U.S. Appl. No. 11/614,828.

International Search Report for PCT/US02/38459 May 12, 2003.

Office Action From U.S. Appl. No. 11/126,736 Dated Apr. 5, 2007.

Office Action From U.S. Appl. No. 11/126,736 Dated Jan. 25, 2008.

* cited by examiner

Vertical

Horizontal

SYSTEM AND PROCESS FOR CHARTING AND DISPLAYING THE TIME AND POSITION OF CONTESTANTS IN A RACE

CROSS REFERENCE TO RELATED APPLICATIONS

This application is a non-provisional application and claims priority from provisional application Ser. No. 60/752,762 filed on Dec. 21, 2005; this application is also a continuation in part application of U.S. application Ser. No. 11/126,736 wherein the '736 application claims priority from U.S. provisional application Ser. No. 60/577,430 filed on Jun. 3, 2004, and wherein the '736 application is a continuation in part application of U.S. application Ser. No. 10/860,867 filed on Jun. 3, 2004 wherein the '867 application is a continuation in part application of International Application Serial No. PCT/US2002/38459 filed on Dec. 3, 2002, wherein the international application claims priority from provisional application Ser. No. 60/336,620 filed on Dec. 3, 2001. This application is also a continuation in part application of U.S. patent application Ser. No. 10/860,867 filed on Jun. 3, 2004, wherein the '867 application is a continuation in part application of International Application Serial No. PCT/US2002/38459 filed on Dec. 3, 2002; wherein the international application claims priority from provisional application Ser. No. 60/336,620 filed on Dec. 3, 2001 wherein the disclosures of application Ser. Nos: 60/752,762; 60/577,430; 10/860,867; US2002/38459; are all incorporated herein by reference.

BACKGROUND OF THE INVENTION

The invention relates to a system and a process for determining the time and position of a contestant in a race. More particularly, the invention relates to a system and a process for determining the times for each contestant at particular positions or splits in a race and for determining the position of each contestant in relation to an inside guide, or rail of the track at each of these particular splits.

Timing and position systems are known in the art. For example the following U.S. Patents generally disclose timing and/or positioning systems for contestants in a race: U.S. Pat. No. 6,072,751 to Kirson et al issued on Jun. 6, 2000; U.S. Pat. No. 5,844,861 to Maurer issued on Dec. 1, 1998; U.S. Pat. No. 5,737,280 to Kokubo issued on Apr. 7, 1998; U.S. Pat. No. 5,138,550 to Abraham et al issued on Aug. 11, 1992; U.S. Pat. No. 4,774,679 to Carlin issued on Sep. 27, 1988; U.S. Pat. No. 4,571,698 to Armstrong issued on Feb. 18, 1986; U.S. Pat. No. 4,274,076 to Hermanns et al. issued on Jun. 16, 1981; U.S. Pat. No. 4,142,680 to Oswald et al issued on Mar. 6, 1979; U.S. Pat. No. 3,946,312 to Oswald et al. issued on Mar. 23, 1976; U.S. Pat. No. 3,795,907 to Edwards issued on Mar. 5, 1974; and U.S. Pat. No. 3,781,529 Abramson et al. Issued on Dec. 25, 1973 wherein the disclosures of all of these patents are herein incorporated by reference.

SUMMARY

One embodiment can be a system and a process for determining the timing and position of contestants on a track. This system can include at least one directional antenna disposed on a side of a track. There can also be at least one competitor communication device (CCD) that can be coupled to each contestant. There can also be at least one remote base station, wherein the competitor communication device determines a contestant time as the contestant passes the directional antenna and then communicates this time data or other data to the base station or another display station. The directional antenna can be used to compress a high-frequency electric magnetic field. The frequency can be on the order of 2.4 GHz which can be compressed by a 15 dBi directional antenna. An example of a directional antenna can be a Hyperlinktech HG24115G. With a well designed antenna, the electric-magnetic forms a virtual loop. By detecting the peak position in time domain, the timing information can be obtained.

This feature is particularly useful in determining the performance of a competitor wherein during a race, this performance will be processed and presented in real time and published for future race handicapping.

The CCD can comprise a positioning sensor in the form of a coil for reading the magnetic field from these loops. An amplifier which can be a logarithmic amplifier and a tuning capacitor may also be coupled to this coil. This sensor is coupled to a microprocessor and to a power input. The power input can be in the form of a battery that may also include a DC-DC boost converter to give the components for example, a 5V power supply. In addition, coupled to the microprocessor and the power input is a transceiver wherein there is an antenna coupled to the transceiver. In addition, a video and audio input can also be coupled to the power input and to the microprocessor.

The microprocessor can include and/or perform a set of instructions that creates a unique identity for the sensor unit. This unique identity allows the remote base station to track each individual contestant individually and to match the time and position of each individual contestant on the track for handicapping of a race or for race analyzation processes. The microprocessor can also include a synchronization protocol which sets periodic transmissions of signals from at least one transceiver to the at least one remote processing or base station. This synchronization protocol can be a time division multiple access (TDMA) protocol where collision is avoided by assigning each transceiver its own time slot.

This microprocessor also controls the audio and video transmission from each contestant so that the audio and video transmission is sent from only one contestant at a time. In this case, a competitor communication device can include a video and audio reader so as to take pictures or record video or audio.

There is also a process for determining the position and timing of each contestant in a race. This process includes the steps of attaching at least one CCD on at least one individual contestant. This CCD can, for example, be connected to a head piece such as a blinder on a horse, a saddle, or any other section which would allow connection. Next, the race starts, whereby during the race, the position and time for each contestant is recorded. Next a signal is transmitted from the CCD to a remote base station. Finally, these signals are synchronized so that there is no interference.

In another embodiment of the invention, the CCD is a three dimensional magnetic field sensor which detects an absolute value of an ambient AC magnetic field. This absolute value depends on the sensor's position in space but not on the sensor's rotation.

The sensor can comprise of a plurality of XYZ coils which pick up the X, Y, and Z component of the field. The coil signals are then amplified by a set of amplifiers each connected to the XYZ coils. The amplitude of the signals fed from the amplifiers is detected by a plurality of amplitude detectors in communication with each of the amplifiers. There are then a set of analog to digital converters with at least one analog to digital converter in communication with each of the amplitude detectors. These analog to digital converters then feed into a microprocessor, which in turn calculates the absolute value of the magnetic field.

In one embodiment of the invention, there is also a loop of wires that generate a signal to be read by a sensor. The loop of wires essentially form a trapezoidal shape along a vertical plane above or below a racetrack. The trapezoidal shape of the wires is used to determine the position of each of the sensors as the sensor crosses the wire.

In another embodiment of the invention the loops can be placed along an inside rail of a racetrack wherein these loops can be in the form of elongated loops extending along a length of the track.

In another embodiment of the invention, the loops can be extended above a racetrack wherein two loops can be disposed above competitors and extend substantially parallel to each other.

In another embodiment of the invention, there can be a loop system wherein in this embodiment, the device includes a loop that can be positioned underneath a track via a process called directional drilling. In this case, the equipment drills a tiny hole and pulls the cable through this hole so that the racetrack is not affected at all. In this embodiment, the wires can be placed approximately 1.5 meters below the track surface. Depending on improvements in technology and the conditions of the track, the depth of placement below the track surface may be adjusted. This loop can include essentially two loops with a first loop coupled to a second loop wherein both loops are driven or powered by a loop driver. These loops or loop systems can be placed around a track at any point, but may be particularly placed at fraction points around a track such as the start, the ¼ mile marker, the ½ mile marker, the ¾ mile marker, the one mile marker and the finish line if the finish line is not on a fraction line. In this case, the start position may be adjusted because races such as horse races usually adjust the starting position of the race based upon the length of the race while usually keeping a standard finish line.

Essentially, the loop can be in the shape of a large "V" with one arm perpendicular to the race track and the other arm positioned at an angle. Power can flow through the loop in a counter clockwise manner wherein this power can flow out from a loop driver and through the second loop first and then flow through the first loop and then back to the loop driver. Using a computer simulation of the magnetic field readings, the signal can be picked up by a sensor positioned in a CCD and placed either on a horse or a jockey. This signal is then relayed to a remote base station for further readings and analysis.

When determining the timing, speed and rail position, the speed information can be obtained by calculating the slope steepness of a detected power curve. In this way, the simplest way is to measure the distance between two threshold points along the curve. This can provide a preliminary speed reading.

To determine the rail position and speed refinement, the detected power curve can be fit on the pre-detected power surface to derive more accurate rail position and speed information. The power function is unique for each antenna, this is because while each antenna may be designed the same, it is operated under different environments. While these individual features or characteristics may be reported the entire speed curve can also be reported, to provide a whole array of statistics for a user.

There can also be a process for tracking and reporting the position of contestants in a race. This process can include a first step of creating an ambient field in at least one position on a track. Next, there could be the process of attaching at least one individual contestant positioning device on at least one contestant such as a horse. This positioning device is equipped to measure the magnitude of the magnetic field on the contestant. Next, a race could be started wherein for example, in a horse race, gates would open and horses would start running. The next step could include recording a position and time of at least one contestant in this race. This position could then be reported on a display such as a television screen or a website for users to calculate or determine the racing characteristics of a race horse. The recording step can include recording a position of at least one contestant relative to an adjacent contestant. When recording the position of contestants this can include comparing a position one contestant to another contestant. The difference in distance between these competitors is then calculated based upon to an average length of a competitor. In horse racing this is described as "lengths".

This step of recording a position and time of the contestants can also include recording a position of a contestant relative to an inside rail. In this case, the position can be measured based upon an average width of a contestant. This reporting of the position of the contestant can include reporting on at least one display in the form of screen including a graphical representation of a full field running order for each of the contestants in a race.

In addition, this step can include reporting a position of a contestant on a display which includes forming on the display a graphical representation of the top three finishers taken at different positions throughout an entire race. This reporting can include a screen displaying a television based graphical representation which can be used to provide an instant race recap for each fraction and finish position for each contestant.

With these reporting features it provides users with multiple advantages in that these users can now determine the split times of each contestant such as a horse and also the position of each contestant such as a horse at different times during a race. This additional set of information can then be very valuable for handicapping a race because this type of particular information would now be known to handicappers of horse races which then allows the handicappers to better calculate the true handicap of a horse.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings wherein similar reference characters denote similar elements throughout the several views:

FIG. 1A is another embodiment of the invention showing another set of loops positioned under a track;

DETAILED DESCRIPTION OF THE PREFERRED EMBODIMENT

Figure 1:
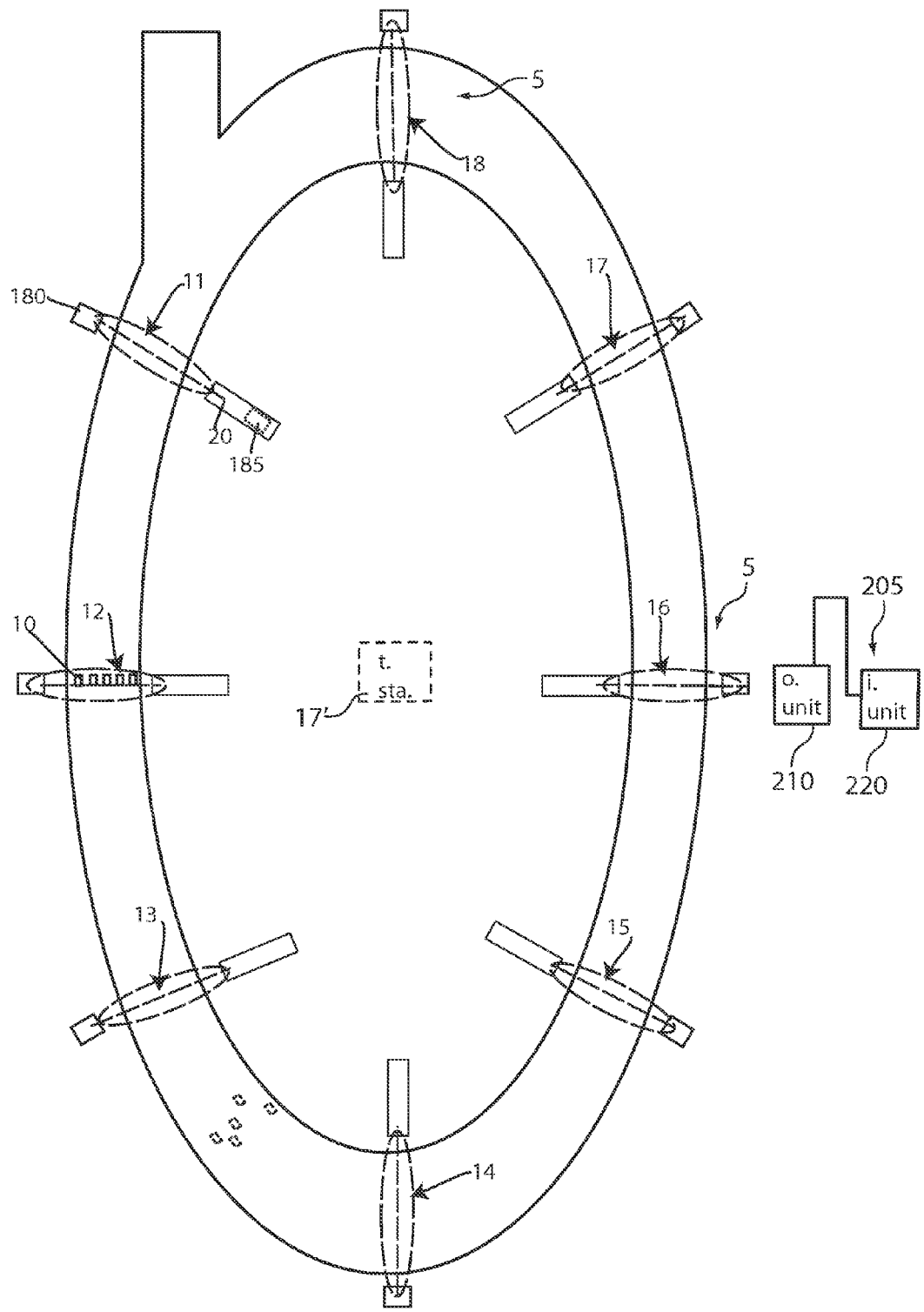
FIG. 1 is a perspective view of one embodiment the system installed on a track.

Referring to the drawings, FIG. 1 is a plan view of the system 5 which includes the (CCD) 10 which is coupled to a contestant such as a horse.

In this embodiment, there is disclosed a series of directional antennas 20, which are disposed in different locations such as locations 11, 12, 13, 14, 15, 16, 17, and 18 which are around a track 5. These antennas are used such that they are for reading a competitor communication device 10, which is disposed on a competitor such as a horse. In addition, there can be an infrared transmitter 185, (See FIG. 2) which is disposed adjacent to the antenna 20. In addition there is an infrared receiver 180 disposed opposite infrared transmitter 185 as well. Transmitter unit 185 includes a plurality of different elements. For example there is an infrared transmitter element 196 which is coupled to a charge controller 192. In addition, coupled to charge controller 192 is a solar receiver 190 which transmits power to charge controller 192.

Figure 2:
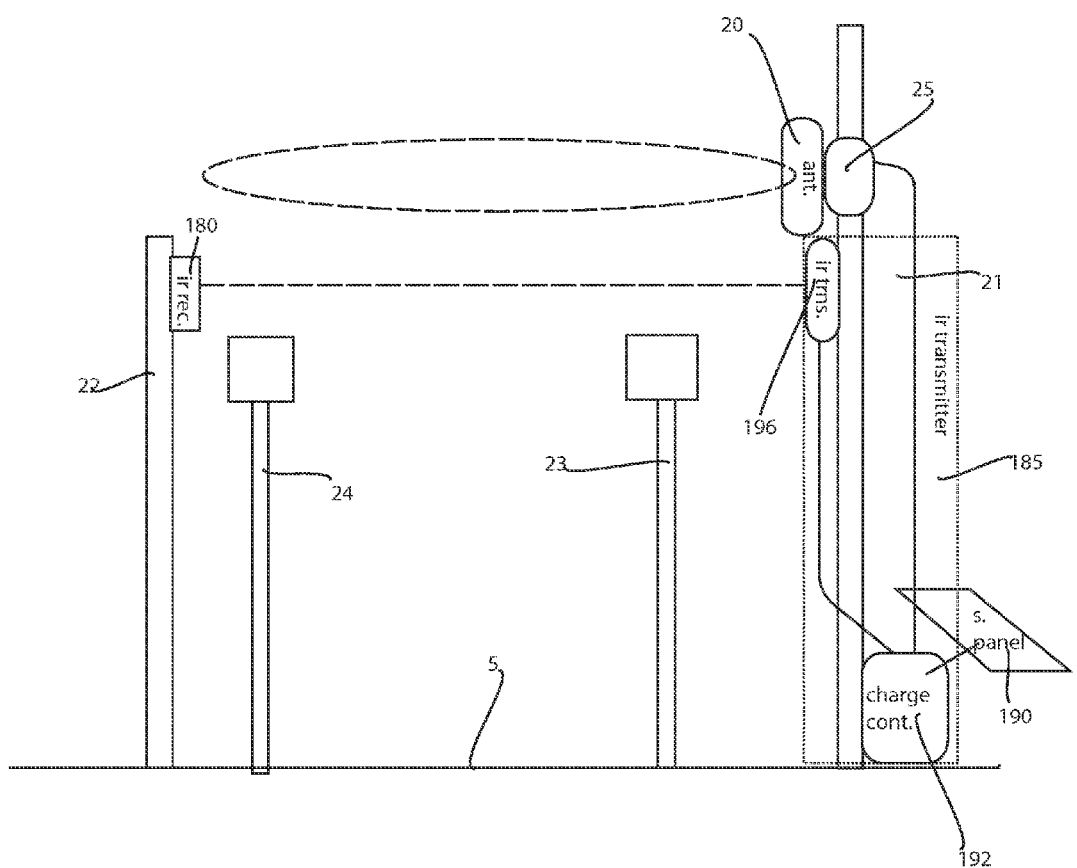
FIG. 2 is a view of a directional antenna configuration which can be used to read the position of a competitor around a track.

An example of a directional antenna 20 is shown in FIG. 2, wherein this directional antenna can be in the form of a Hyperlinktech7 2.4 Ghz 15 dbi diecast aluminum reflector antenna. This type of that device can be used for long-range directional applications, point-to-point systems or point to multipoint systems. The antenna can be applied to a column, or post 21 which can be positioned either inside or outside of a track and then rotated to a particular point on the track. Antenna 20 is coupled to an adjustment hinge 25 which can be coupled to post 21. This adjustment hinge 25, can be used to allow the directional antenna to rotate in any desired manner. This adjustment hinge or connection 25 can also be used to adjust the height adjustment of this directional antenna by sliding this hinge up or down a pole 21. Connected to directional antenna 20 is a solar power station 10' which is shown in greater detail in FIG. 6. In addition, as described above, there is also an infrared transmitter 185 which can be coupled to post 21 as well. This infrared transmitter 185 (See also FIG. 6) along with antenna 20 are disposed inside of an inside rail 23 wherein antenna 20 transmits its field across the track 5 while infrared transmitter 185 transmits a signal across the track to an opposite receiver 180. While the reading of the radio frequencies by the CCD=s 10 is all that is necessary to determine the positioning of each competitor, the infrared system can also be used as a redundant or additional system to determine the spit times of a lead competitor.

Figure 3A:
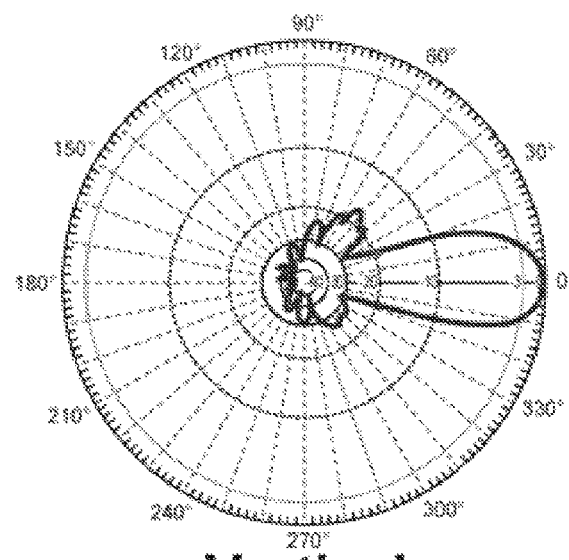
FIG. 3A is a vertical polarization diagram of the projection patterns of the reception signal in a competitor communication device from the antenna shown in FIG. 2.
Figure 3B:
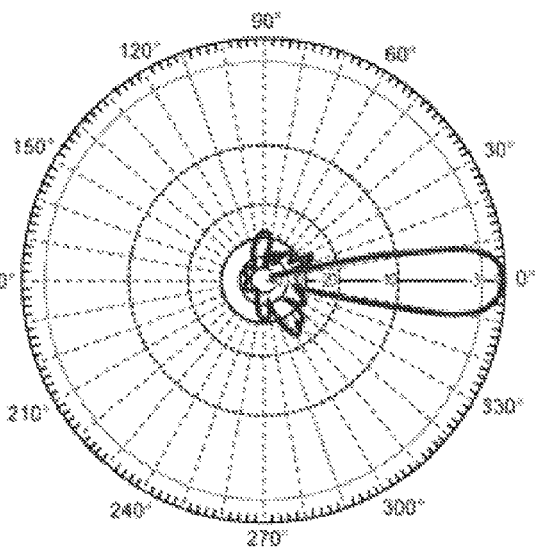
FIG. 3B is a horizontal polarization diagram of the projection patterns of the reception signal in a competitor communication device receiving a signal from an antenna shown in FIG. 2.

As shown in FIGS. 3A and 3B there is shown polarization graph in both the vertical (FIG. 3A) and horizontal planes (FIG. 3B). With this type of antenna 20, the electromagnetic field forms a virtual loop or a column. When a detector such as a CCD passes a field, there is a peak at the middle of loop. By detecting a peak position in a time domain, it is possible to obtain the timing information as well as the position of a competitor on the racetrack. Each antenna 20 is assigned an identity wherein each antenna 20 has a particular position around the racetrack. Therefore, an antenna 20, which is positioned in position 11, is designated as being positioned in a first position around the track. Another antenna can be positioned at a different position 12, while other antennas can be coded differently to send a particular and individual signal from each of the positions 13, 14, 16, 17, and 18 are all recorded by competitor communication devices as being positioned in different positions.

Therefore, each antenna 20 is set to such that a peak reading of the antenna corresponds to a particular position on a track. Therefore, if antenna 14 is positioned in a region that represents a quarter-mile section of the track, the antenna is directed such that, once a competitor crosses a particular peak at the middle of the loop, (See FIG. 3) this reading would represent a quarter-mile position. For example, peak readings are shown in both FIGS. 3A and 3B. FIG. 3B shows a peak reading in the horizontal plane wherein the point on the reading corresponding to 0 degrees is the peak point in terms of amplitude reading in the CCD 10 which indicates that the CCD has crossed a region of highest transmission power of an antenna which corresponds to a particular point on track 5.

As the competitors such as horses are racing around a track, the competitor communication device 10 can receive this reading. This reading is then transmitted to an initial transmitting station 17 to an intermediate a base station 205. Alternatively, the signal from each competitor communication device can be transmitted directly to receiving and display station 800.

Figure 3C:
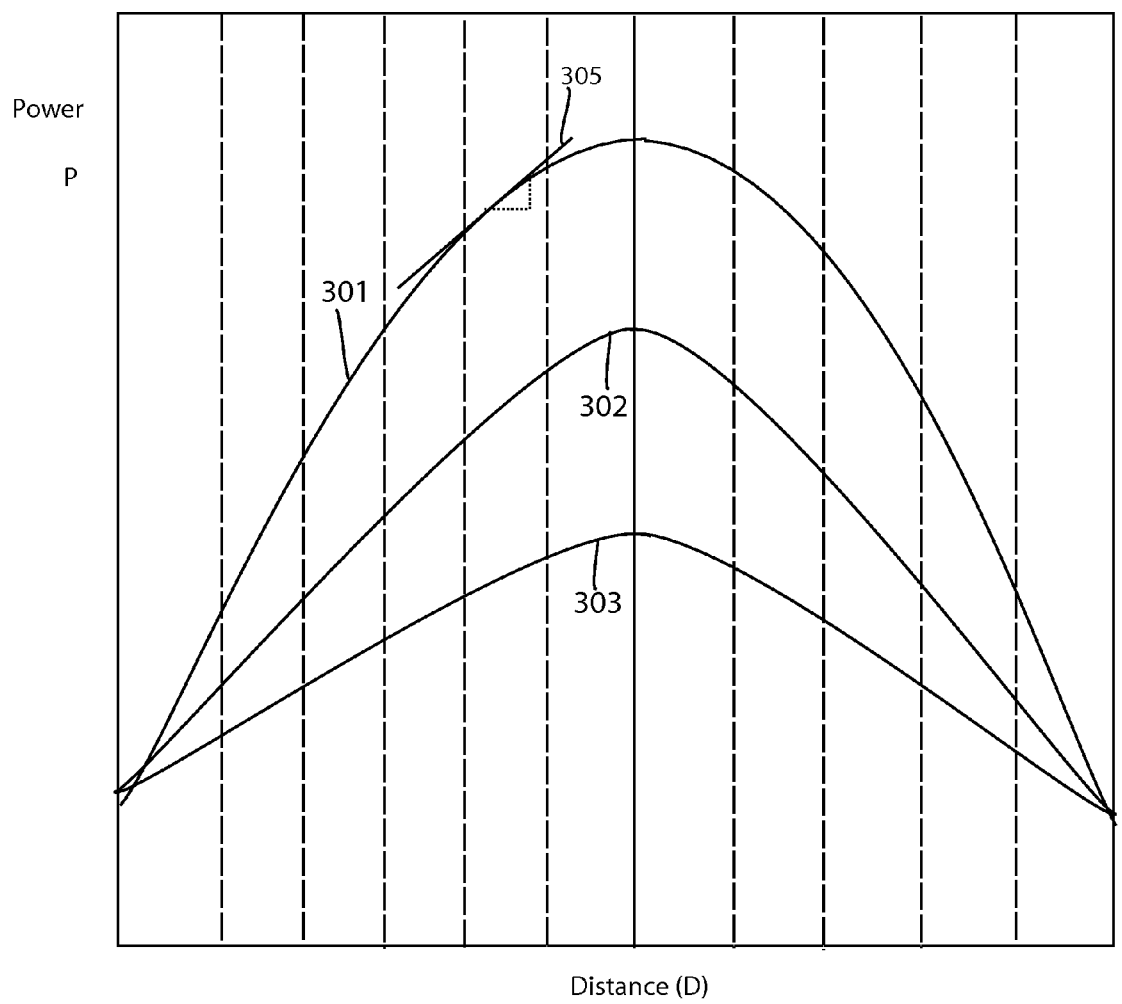
FIG. 3C shows a series of power distribution curves that are read by a communication device based upon a graph which includes a reading of power vs. distance of a receiver from a rail.

Rail position is derived from another characteristic of electric-magnetic field. Since the energy is projected along with a loop direction, if we define the power at a unit distance as P in the form of Po, at a point $(d,\theta)$ where d is the distance from the center, and $\theta$ is the angle (refer to FIGS. 3A and 3B) wherein the detected power can be in the form of:

$$P(d, \theta) = P_o \frac{K}{d^{f(d,\theta)}}$$

Where K is a constant, $f(d,\theta)$ is an even function for $\theta$ (which means that $f(d,\theta)=f(d,-\theta)$) and decreases and d and $|\theta|$ increase. Usually a constant K and function f is unique for each antenna. FIG. 3C discloses the shape of the detected power curve at different distances from the antenna. The basic rail position can be derived from the peak power of the loop, which can be written as:

$$P_o(d) = P(d, 0) = P_o \frac{K}{d^{f(d,\theta)}} = P_o \frac{K}{f_o(d)}$$

Thus, FIG. 3C shows power P as a function of d the distance of a competitor from a directional antenna. This type of reading may be obtained by a competitor communication device 10. In particular, the directional receiving antennas can be used to receive information of a signal sent by directional antenna 20. The speed of a competitor can be determined from the slope of the steepness of the power curve. Two points along a curve can be used to provide a preliminary speed reading.

To determine the rail position, or distance of a competitor from a rail, a power curve can be fitted on a pre detected power surface. Since the power function is unique for each antenna (even the same design in different environments) the power information can be collected at each point in the field, wherein this information can be stored in the remote computer system. Each competitor communication device can be used to store and transmit each power curve. The remote computer base station can either use a direct slope calculation or a recursive approximation to find more accurate rail position and speed information.

For example, from the reading disclosed in FIG. 3C there is shown a first curve reading 301 wherein this reading is of a sharper slope and higher amplitude. This shows that the horse is moving faster relative to the directional antenna 20 and closer to the rail. The second curve 302 has a lower amplitude and a flatter slope. This indicates that the horse is moving slower and is farther from the rail relative to the directional antenna. The third curve 303 has an even lower amplitude or power reading and lower slope. This means that the competitor communication device receiving this reading would be moving slower and farther from the rail relative to the readings of the first and second curves.

Some of the benefits of this system relative to a wired system is that the cost of installation can be lower relative to a wired system. These antennas can be coupled to poles on the antenna. With this design, there is no need to use directional drilling services to install wire loops in a track. In addition, the cost of the system is also lower. In this case, the expense of the wire and conduit under the track is also avoided. Furthermore, the calibration is simpler. In this case, the system can be installed in a few hours wherein the user can enter in positioning and timing services for an event. After the event is over, it can be broken down and taken to a new location easily. Furthermore, this system can be found to be more accurate, especially with regard to reading the distances a horse is located from a rail.

Figure 4:
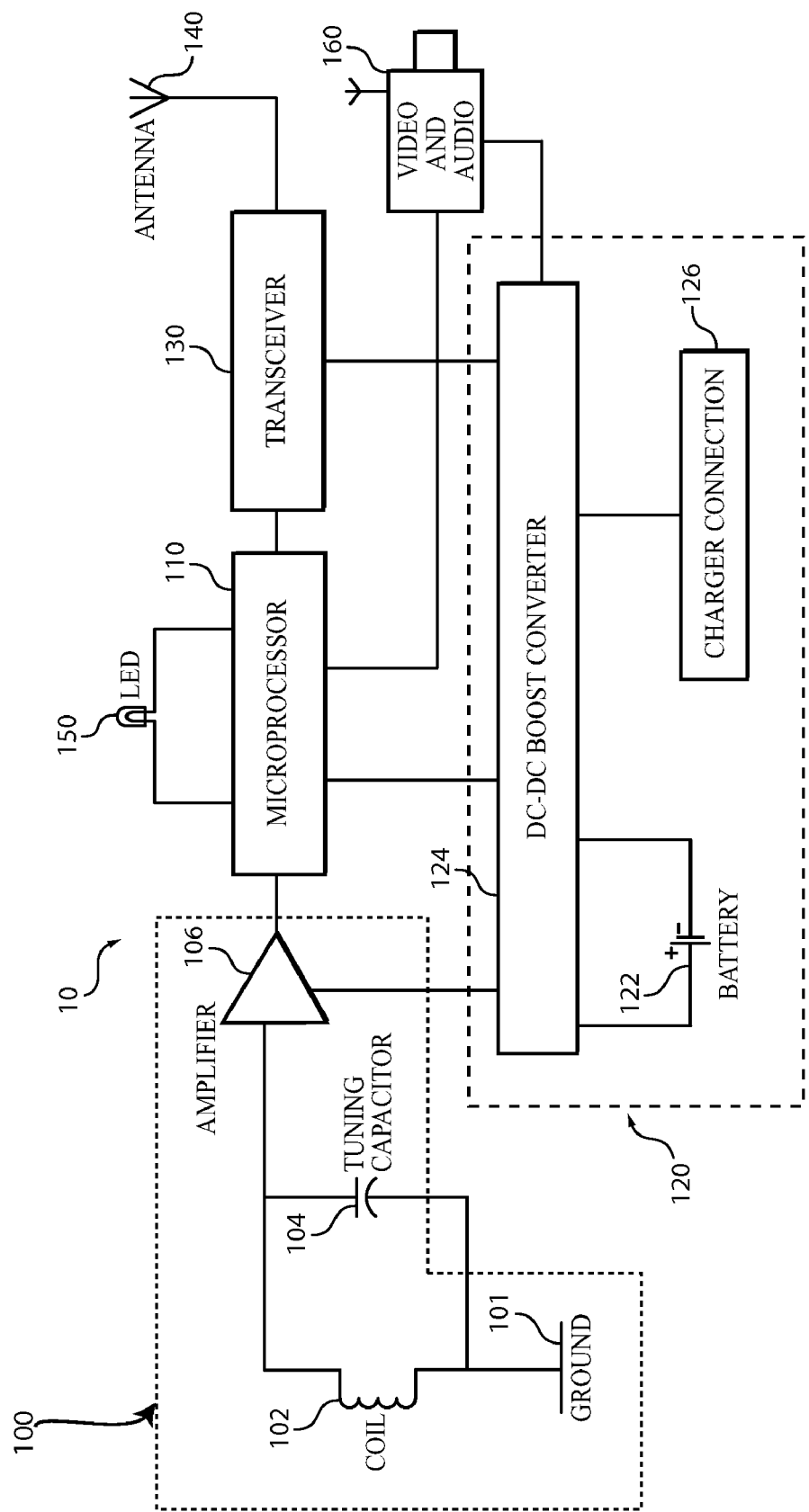
FIG. 4 is a schematic block diagram of a first embodiment of the competitor communication device (CCD)

FIG. 4 shows a schematic block diagram of the CCD 10. This device comprises a position sensor 100 which includes a coil 102, a tuning capacitor 104 and an amplifier 106. Position sensor 100 interacts with magnetic fields created by loops 22 and 24 on the track to determine the position and time of the individual contestant at a particular period of time during the race. Coil 102 is positioned along the X-axis, so that it can read the nulls that occur in the X-component of the magnetic field generated by the loops.

Microprocessor 110 is coupled to amplifier 106, whereby microprocessor 110 contains instructions to control the transfer of signals, the individual timing of the contestant, and to carry a unique identifier to identify each individual contestant.

Coupled to microprocessor 110 is transceiver 130, which can send and receive signals from microprocessor 110 through antenna 140 to and from a base station, such as base station 210 or communicate directly with a remote station 800. There is also a power input 120 which is coupled to amplifier 106, microprocessor 110, transceiver 130, and video and audio input 160. Power input 120 comprises a battery 122, a DC-DC boost converter 124 and a charger connection 126. Battery 122 sends power through DC-DC boost converter 124 such that converter 124 delivers 5V of power supply into the components in the system. Charger connection 126 works in unison with LED 150 and battery 122 so that when battery 122 runs down, LED 150 changes from green to red to indicate that the battery is running out of power. Conversely, once the battery has been fully recharged, LED 150 changes color back from red to green to indicate a full charge.

Video and Audio input 160 is essentially a motion video camera with a microphone that can be placed on a contestant such as a horse. With a horse, while the CCD 10 can be placed in any position on the horse, the camera would most likely be placed on the back of a saddle to capture moving images behind the horse. Microprocessor 110 would then control the sending of this information to a remote base station depending on instructions sent from that remote base station.

Figure 5:
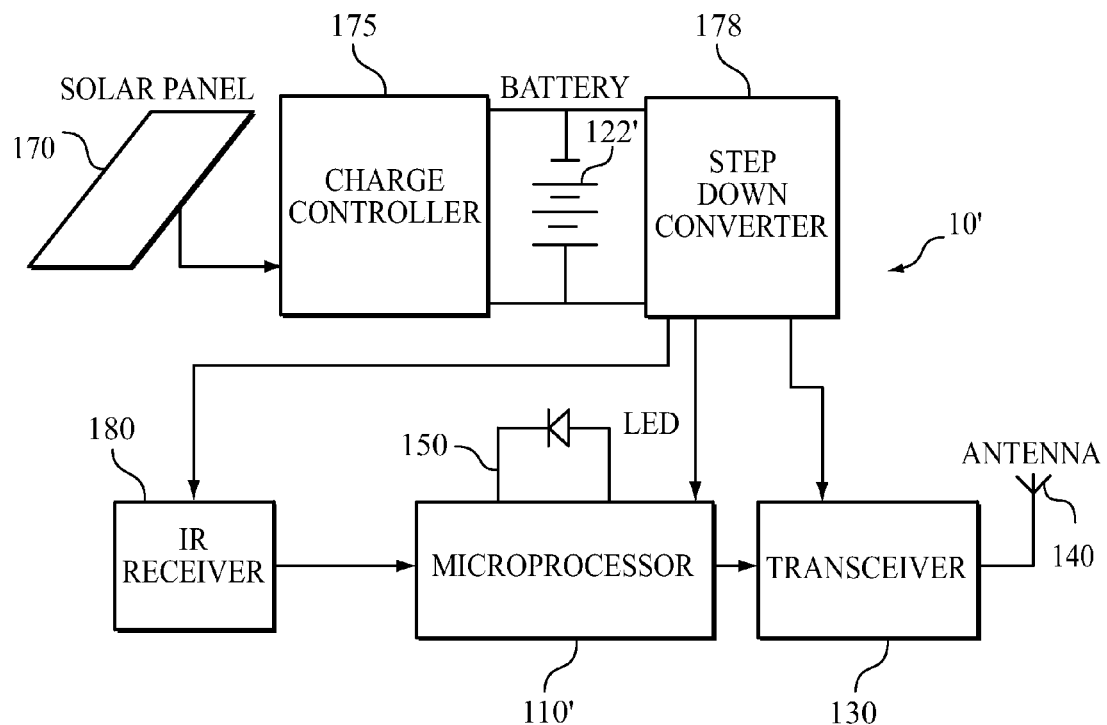
FIG. 5 is a schematic block diagram of a infrared receiving device.

FIG. 5 shows an embodiment of the infrared tracking system 10' (See also FIG. 1). This tracking system 10', includes solar power in the form of a solar powered panel 170 fixed into the system. Panel 170 is coupled to charge controller 175 and produces power to charge controller 175. Charge controller 175 is coupled to battery 122'. Both charge controller 175 and battery 122' are coupled to step down converter 178. Step down converter 178 converts the energy input from both charge controller 175 and battery 122' into usable energy for the remaining components. These components include microprocessor 110' which functions similar to microprocessor 110, and transceiver 130 which is essentially identical to transceiver 130 in FIG. 3. In addition, antenna 140 is coupled to transceiver 130 as well. This device can also include an LED indicator 150' which is similar to LED indicator 150 and indicates whether the device is charged and/or running.

With this embodiment, there is an infrared or IR receiver 180 coupled to microprocessor 110'. IR receiver 180 is used as a position sensor to determine the time and position of the individual contestant as that contestant is racing in a race. Essentially, IR receiver 180 receives an infrared beam from IR transmission device 185. IR receiver 180 and IR transmission device 185 are positioned at a start pole on opposite sides of the track, so that at the start of the race, these devices can track the exact start of the race by having the competitors cross the IR beam being sent between transmission device 185 and receiving device 180. Thus when the race starts, this beam is broken and then a signal is sent to a base station to start the race clock.

Figure 6:
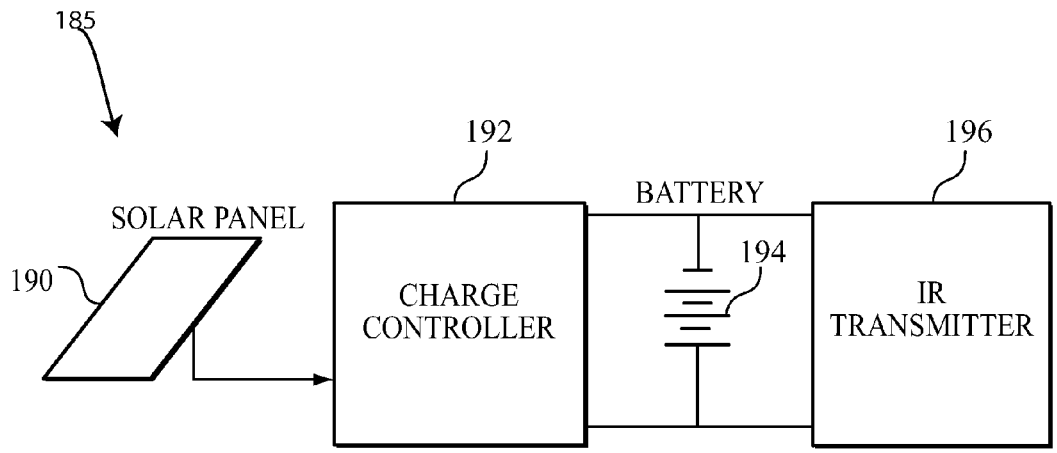
FIG. 6 is a schematic block diagram of a remote infrared terminal associated with the receiving of the device shown in FIG. 5.

As shown in FIG. 6, IR transmission device 185 includes solar panel 190, a charge controller 192 for controlling the charge from solar panel 190, a battery 194 and an IR transmitter 196 for transmitting position signals to and from each contestant.

Because there is both an IR based system and a magnetic based system at each terminal, this provides a redundant system for tracking the race contestants. The IR based system does not contain information relating to the identity of each contestant. However, the IR based system does relay the time that the first competitor crosses each mark. Thus, at a very minimum, this IR based system can be used to verify the start and ending times of a race.

Figure 7A:
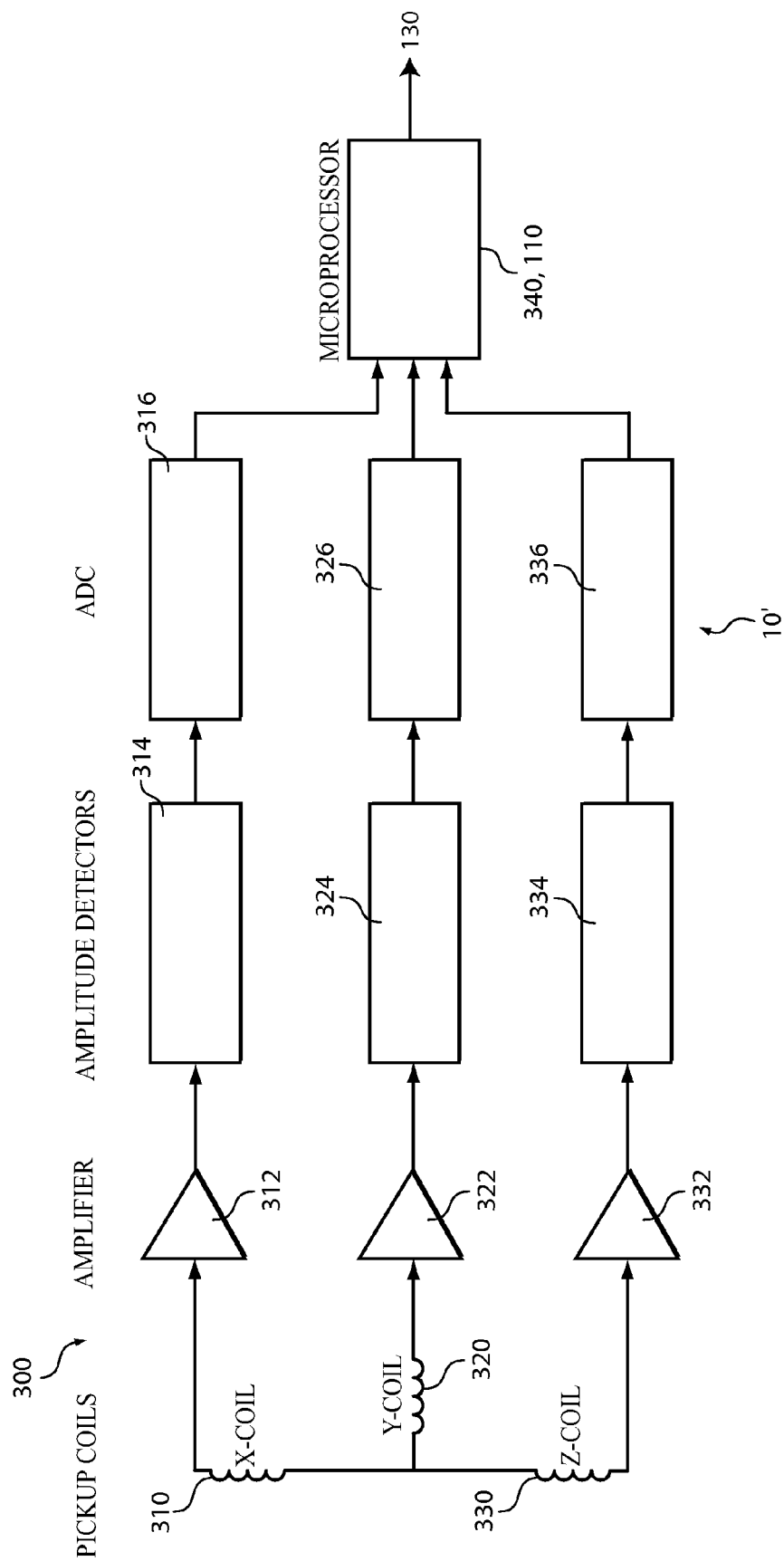
FIG. 7A is a schematic block diagram of a of another embodiment of a competitor communication device.

FIG. 7A is a schematic block diagram of a second embodiment of a sensor or CCD 300 which contains an x coil 310, a y coil 320 and a z coil 330. An amplifier 312, is in communication with x coil 310 while an amplifier 322 is in communication with y coil 320 while a third amplifier 332 is in communication with z coil 330. There is also a set of amplitude detectors 314, 324 and 334 with amplitude detector 314 in communication with amplifier 312, amplitude detector 324 in communication with amplifier 322, and amplitude detector 334 in communication with amplifier 332. A set of analog to digital converters (ADC) 316, 326, and 336 are also coupled to the amplitude detectors 314, 324, and 334 respectively. With this connection, ADC 316 is in communication with amplitude detector 314, ADC 326 is in communication with amplitude detector 316, and ADC 336 is in communication with amplitude detector 326. Finally, a microprocessor 340 is in communication with ADCs 316, 326 and 336 at a downstream end. Microprocessor 340 then can communicate with a transceiver 130 at a downstream end so that this information can be communicated onward to the appropriate base stations.

The sensor operates as follows, x, y, and z components of a signal are picked up by x, y, and z coils 310, 320 and 330 respectively. The components of this signal are fed from these coils into their respective amplifiers 312, 322, and 332. The coil signals are amplified by the amplifiers and then the amplitude of each of these signals is obtained by the amplitude detectors 314, 324, and 334 respectively. These amplitudes are then digitized by the ADCs 316, 326, and 336 respectively wherein this information is fed into microprocessor 340.

The microprocessor then calculates the absolute value of the magnetic field using a program that follows the following formula:

$$B = \sqrt{bx^2 + by^2 + bz^2}$$

Where:

B is the total magnitude of the field

Bx, By and Bz are the magnitudes read by the x, y and z coils respectively. Because of these three coils extending in the three dimensions are used, these coils can be used to determine the position of each party in all three dimensions.

Figure 7B:
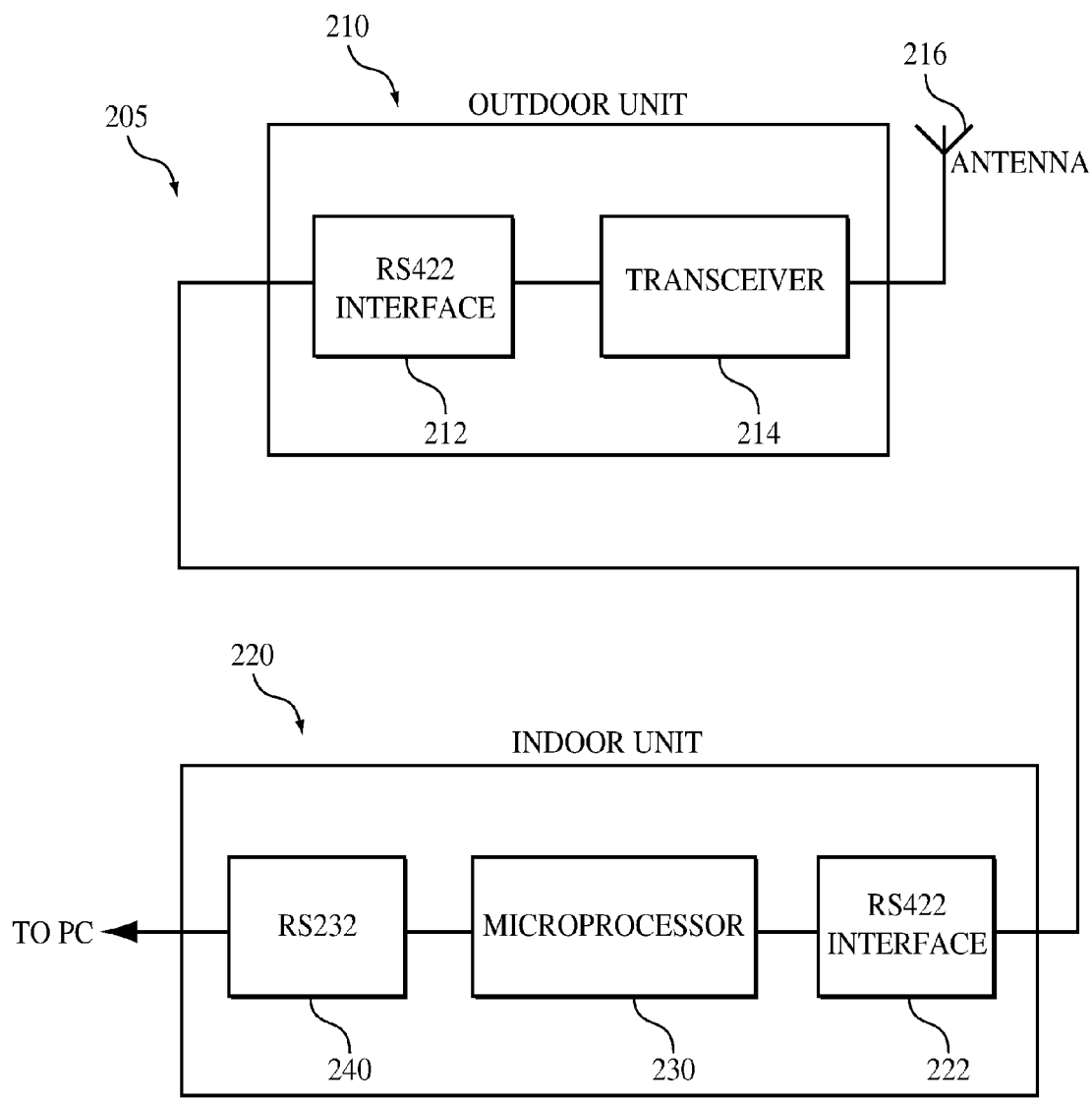
FIG. 7B is a schematic block diagram of an indoor and an outdoor transmitting unit.

FIG. 7B is a schematic block diagram of a base station 205 which is also shown in FIG. 1. Base station 205 includes an outdoor unit 210 and an indoor unit 220. Outdoor unit 210 includes an RS422 interface which is coupled to a transceiver 214. Transceiver 214 is also coupled to an antenna 216 which is designed to receive signals from antenna 140 on device 10. Essentially information in the form of signals flows into antenna 216 from one or more devices 10 during a race. This information is sent through transceiver 214 and then through RS422 interface 212 and then onto indoor unit 220. Indoor unit 220 also includes a RS422 interface 222 and a microprocessor 230. Essentially, these RS 422 interfaces allow communication between the outdoor and indoor devices via appropriate cabling. Microprocessor 230 reads and identifies these signals and also sends signals back through outdoor unit 210 to control the protocol and sending of transmissions from devices 10. Information from microprocessor 230 is then sent on to RS 232 interface 240 which then transfers this information on to a personal computer for transmission to an Internet site or to post results internally for handicapping.

The system operates as follows: each contestant receives a competitor communication device 10 which can be attached to each contestant by any known means such as a belt, a strap, etc. This device is turned on and it may run one or more test signals to base station 205 so that each device 10 is pretested to communicate with base station 205 or central station. Each contestant lines up at a starting line which contains a field provided by a directional antenna or loops, and the infrared system which projects an infrared beam. Each competitor communication device reports its time stamp and identity information to the base station 205 or a central station 800 prior to the start of the race. At least one report is presented to the central station for all CCD's at a substantially simultaneous time. At this point, all of the times in the CCD's are synchronized or compared in the software. A race indicator goes off whereby the contestants are notified of the start of the race. This start may occur via a gun, bell, or a horn sounding. After the start, each competitor moves out of the starting position and crosses the startline which is positioned with the first ambient field. As each competitor crosses the peak amplitude reading of this ambient field, the associated CCD reports its individual time stamp and identity to central station 800. This crossing of a peak in the ambient field, starts the race clock. Alternatively, if the system is relying on an infrared system, the start of the race occurs when the first contestant crosses an infrared beam. In this case, there can be many clocks running at once. First, there is a universal race clock which determines the universal race time. There are also individual clocks that determine the split times for each competitor's split. These separate times are useful because it allows the analyzation of the true starting times for each contestant. Thus, if a contestant is quick off of the start there will be little or no time lag between the universal race time and that individual competitor's race time. However, if the contestant is slow off the start, then there will be a large or even larger time lag for that competitor.

Each split is recognized in each CCD as a peak reading of amplitude from the ambient field. As each contestant or competitor crosses each of the splits, the identity of each CCD, the individual times for each contestant, and the amplitude level of each reading is sent to base station 205 or to central station 800. Central station 800 can then contain a program that determines the actual split times of each contestant based upon the difference between the current individual time reading and a previous split time reading. In addition, this program can determine the position of each competitor based upon its distance from the rail, based upon the level of the amplitude of each reading for each competitor.

All of the competitors race around the track until they reach the finish line whereby as they reach the finish line, their times are clocked into base station 205 or a central station 800. The overall winning race time stops when the first competitor crosses the finish line field.

During this race, the position of each individual contestant is also recorded. The position of each contestant at each split is also sent to base station 205 or central station 800 and recorded. In addition, during this entire race, base station 205 or central station 800 is controlling processor 110 in competitor communication device 10 to determine whether to send audio and video signals. In addition, base station 205 or central station 800 is sending controlling signals for the transmission of this information via a synchronized relay system explained above so that there is no interference of signals from any of the CCDs.

Figure 8A:
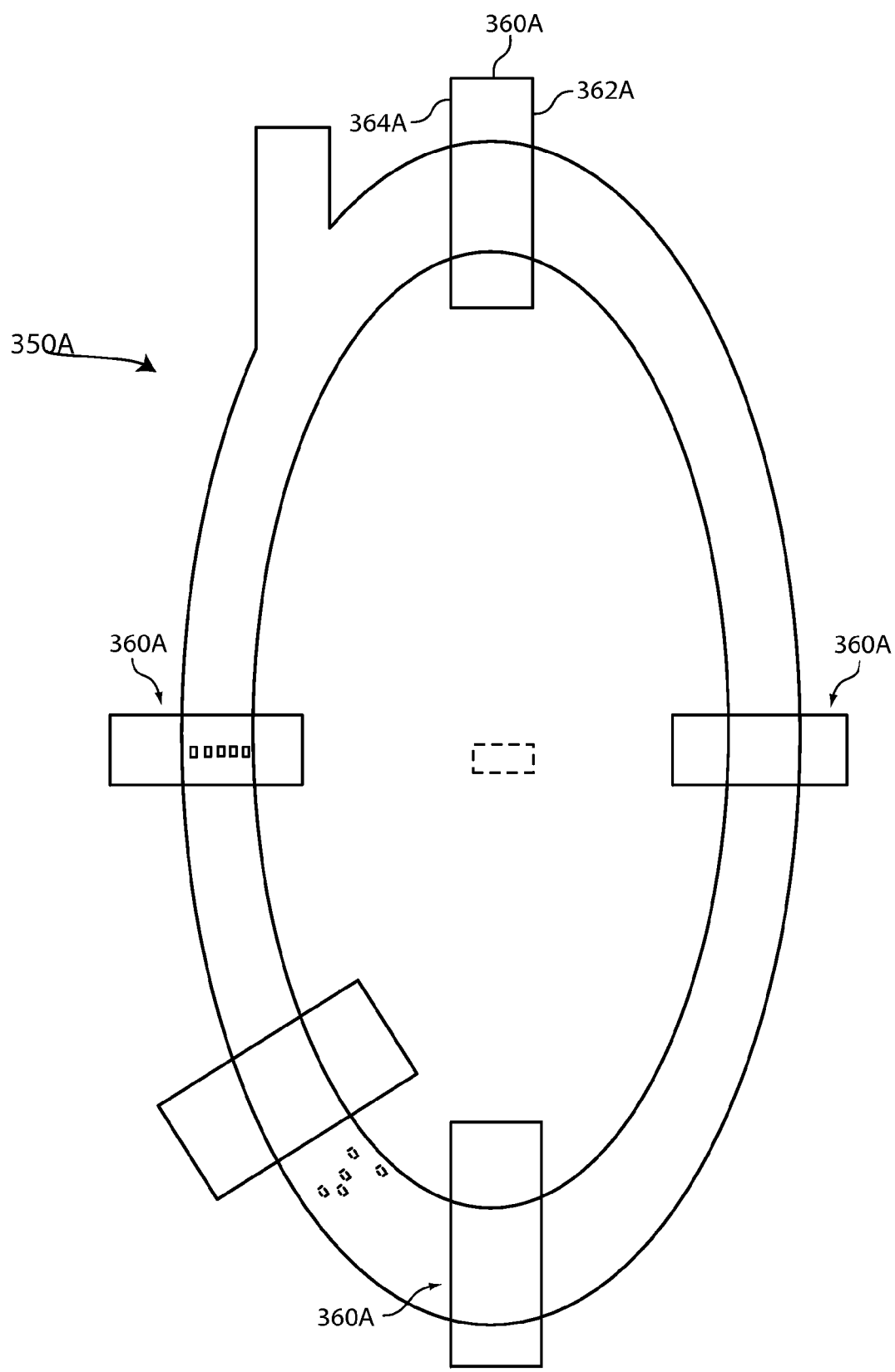
FIG. 8A is a top view of another embodiment of the invention showing a top view of loops positioned around the track.
Figure 11A:
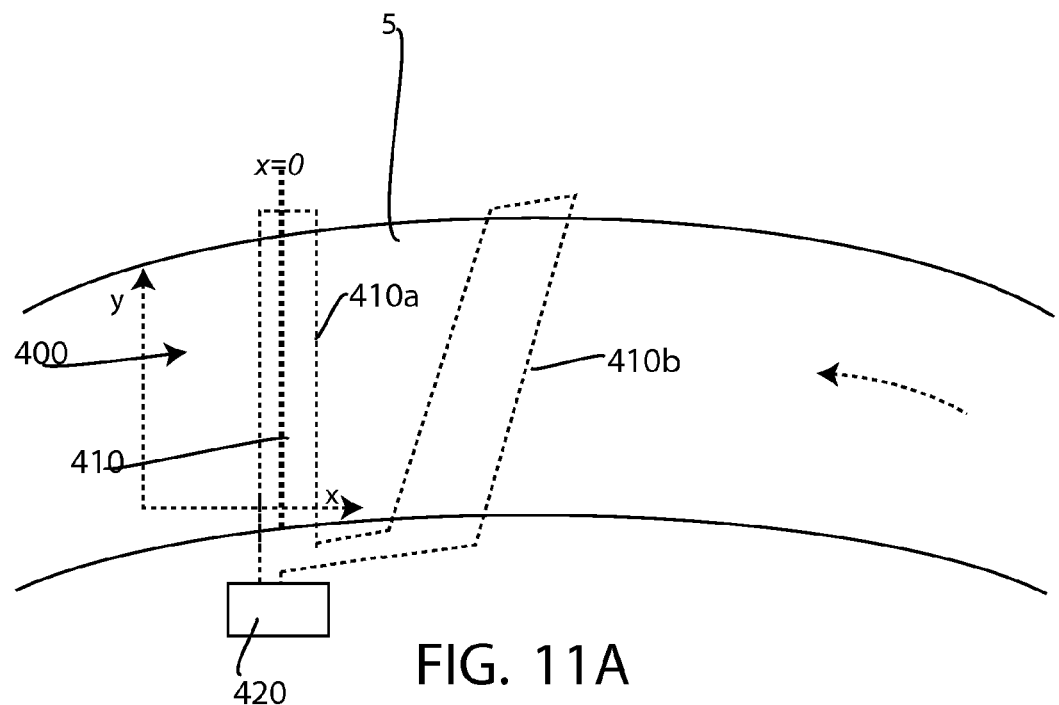
FIG. 11B is another set of graphs showing a reading of a CCD in the embodiment shown in FIG. 1A.

FIG. 8A is a top view of a second embodiment of a track system 350A which shows loops 360A disposed at different locations about the track. Loops 360A are spaced above the track and extend from the rail to the outside of the track as shown in FIG. 11A. Loop 360A essentially contains a first wire 362A and a second wire 364A wherein first wire 362A and second wire 364A are elevated above a track via elevation poles 366A.

Figure 8B:
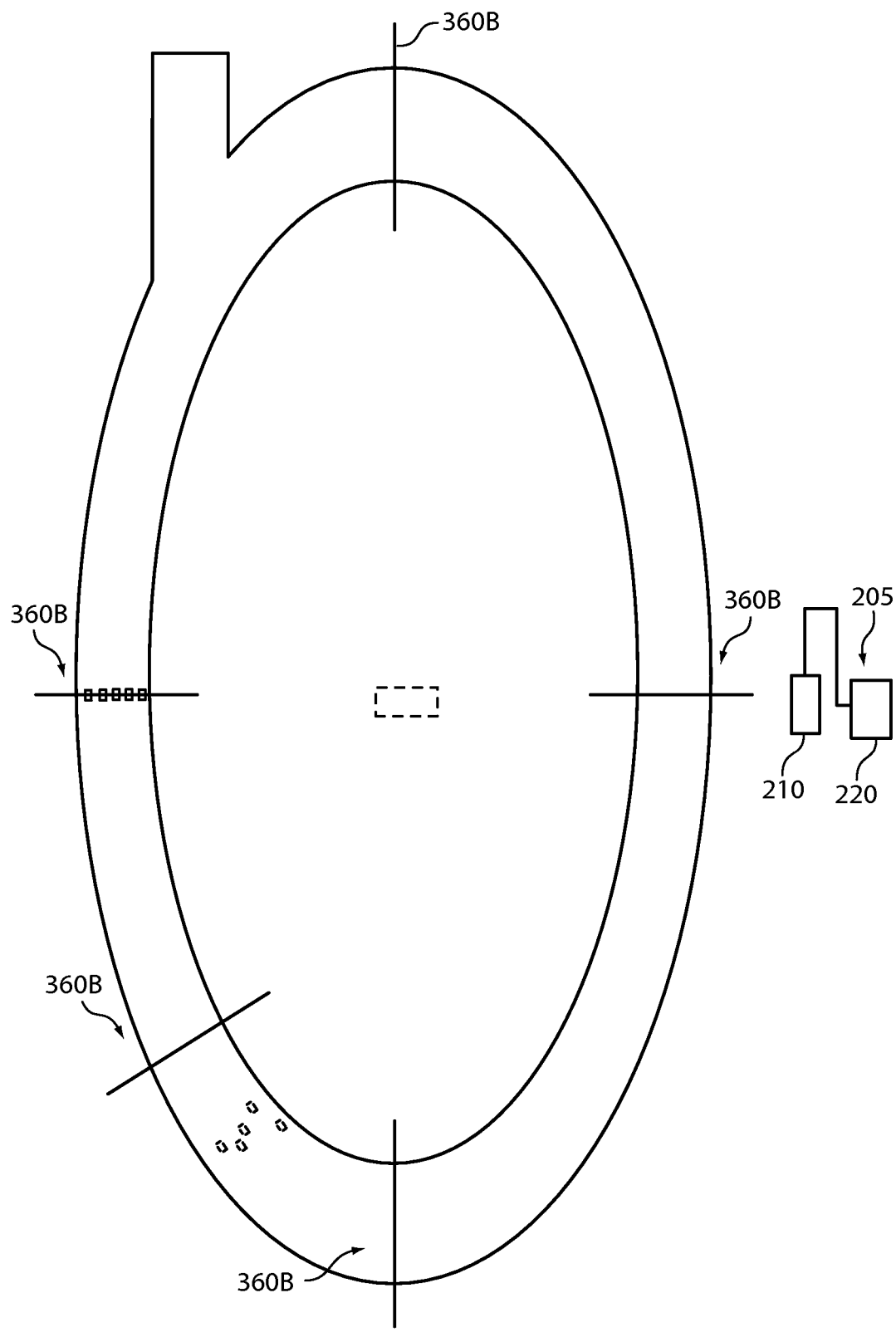
FIG. 8B is a top view of another embodiment of the invention showing another form of loops positioned around a track.
Figure 9A:
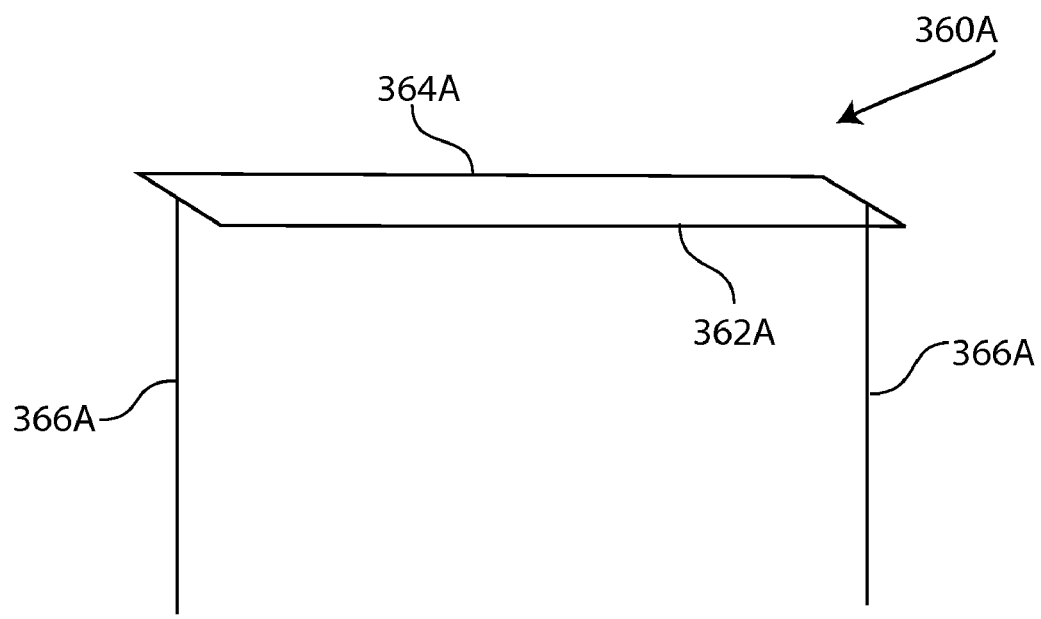
FIG. 9A is top view of another embodiment of the invention showing another form of loops positioned around the track.
Figure 9B:
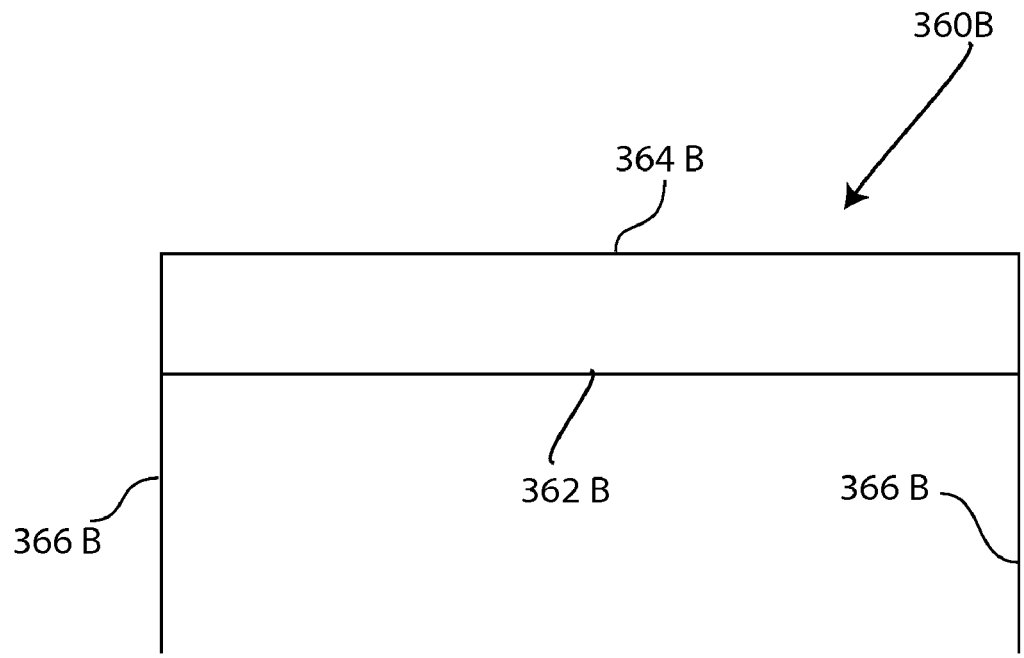
FIG. 9B is another embodiment of the invention showing another set of loops.

FIG. 8B is a top view of a third embodiment of a track 350B which shows vertical loops 360B disposed at different locations about the track. Loops 360B are substantially rectangular shaped loops as shown in FIG. 9B. Loop 360B contains a first wire 362B and a second wire 364B which are elevated above a track via elevation poles 366B.

Figure 10:
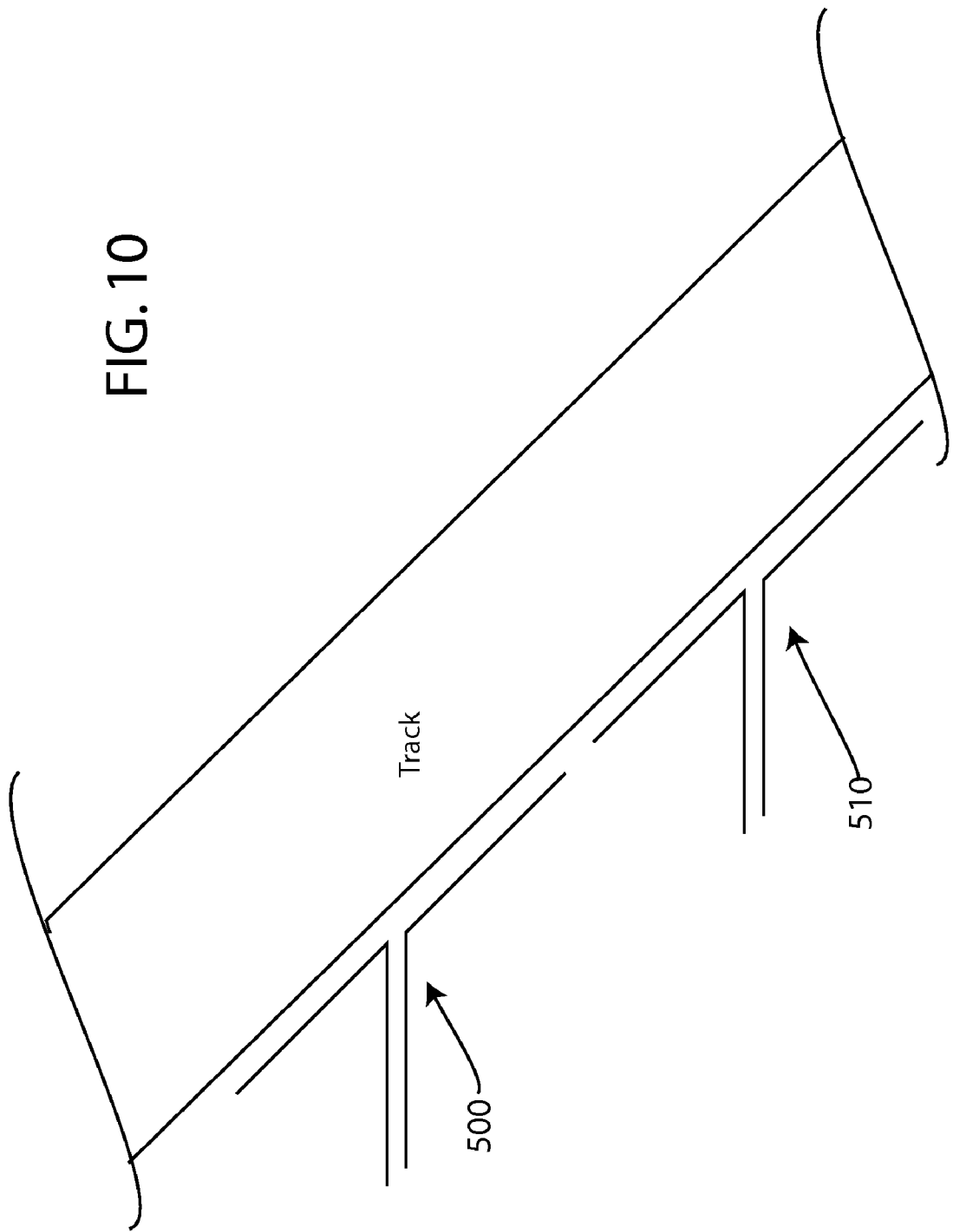
FIG. 10 is another embodiment of loops positioned around a track.

FIG. 10 shows a view of another embodiment of this device wherein dipoles 500 and 510 are shown along an inside rail of an associated track. Dipoles 500 and 510 can extend up to 60 m long each for a total of both dipoles being up to 120 m in length along the track. Each dipole or dipole set is powered to create an ambient magnetic field. The ambient magnetic field will create an associated magnetic reading in a CCD which is shown by way of example in FIGS. 3B, 3C, and 11B.

FIG. 11A shows another embodiment of the invention which includes a different loop system 400 wherein in this embodiment, the device includes a loop that is positioned underneath a track via a process called directional drilling wherein the equipment drills a tiny hole and pulls the cable through this hole so that the racetrack is not affected at all. In this embodiment, the wires can be placed approximately 1.5 meters below the track surface. FIG. 11A shows the shape of this loop 410, which includes a first loop 410a coupled to a second loop 410b wherein both loops are driven or powered by a loop driver 420. These loops or loop systems 400 can be placed around a track as shown by example in FIG. 1 at any point, but may be particularly placed at fraction points around a track such as the start, the ¼ mile marker, the ½ mile marker, the ¾ mile marker, the one mile marker and the finish line if the finish line is not on a fraction line.

Essentially, the loop is the shape of a large "V" with one arm 410a extending perpendicular to the longitudinal axis of the race track and the other arm 410b positioned at an angle relative to this first arm. Power can flow through the loop in a counter clockwise manner wherein this power can flow out from loop drive 420 and through loop 410b first and then flow through loop 410a and then back to loop driver 420.

Figure 11B:
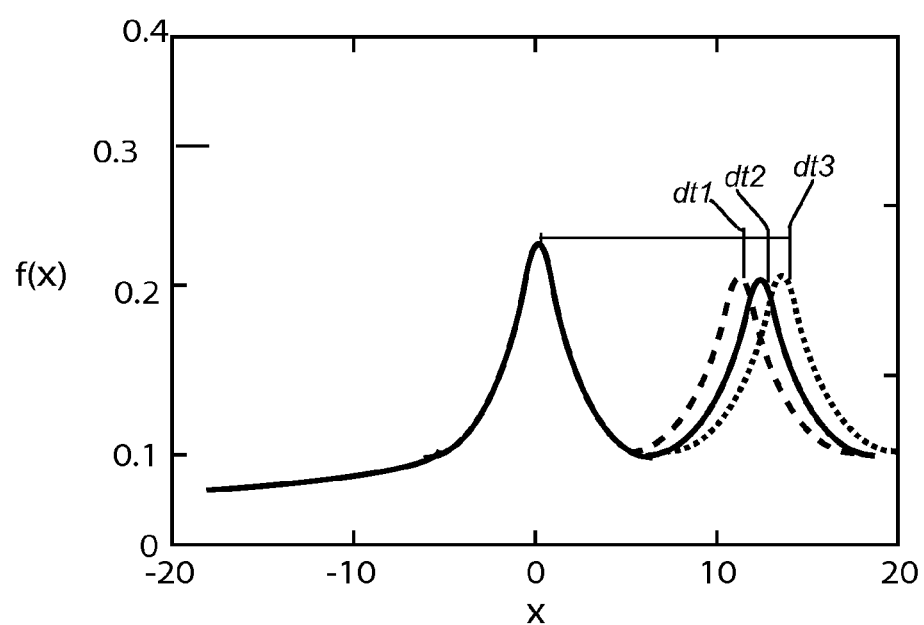

Thus, each sensor records two values, the time of the second peak (T2), and the delay between the peaks (dT=T2−T1). This information is then reported to the base station. Time T2 is used directly for timing purposes. In this case, the base stations can calculate the average sensor speed based upon measurements of T2 at the previous and at the current point of call which is determined when the sensor crosses a center point of each loop 410a for each loop positioned around the track. As shown in FIG. 11B, dt1 is for the contestant that is four meters from the center of the track surface towards the inside rail, dt2 is the time for the contestant at the center portion of the track, and dt3 is the time for the contestant four meters from the center of the track towards the outside rail.

Knowing dT and the speed of each contestant, the x distance or traveling distance between the peaks can be calculated. Then, taking into account the geometry of the loops, the distance of the rail is calculated. In this case, if the x distance is larger, then the distance from the rail is calculated to be larger as well. If the x distance is smaller then the distance from the rail is also calculated to be smaller as well.

Figure 12:
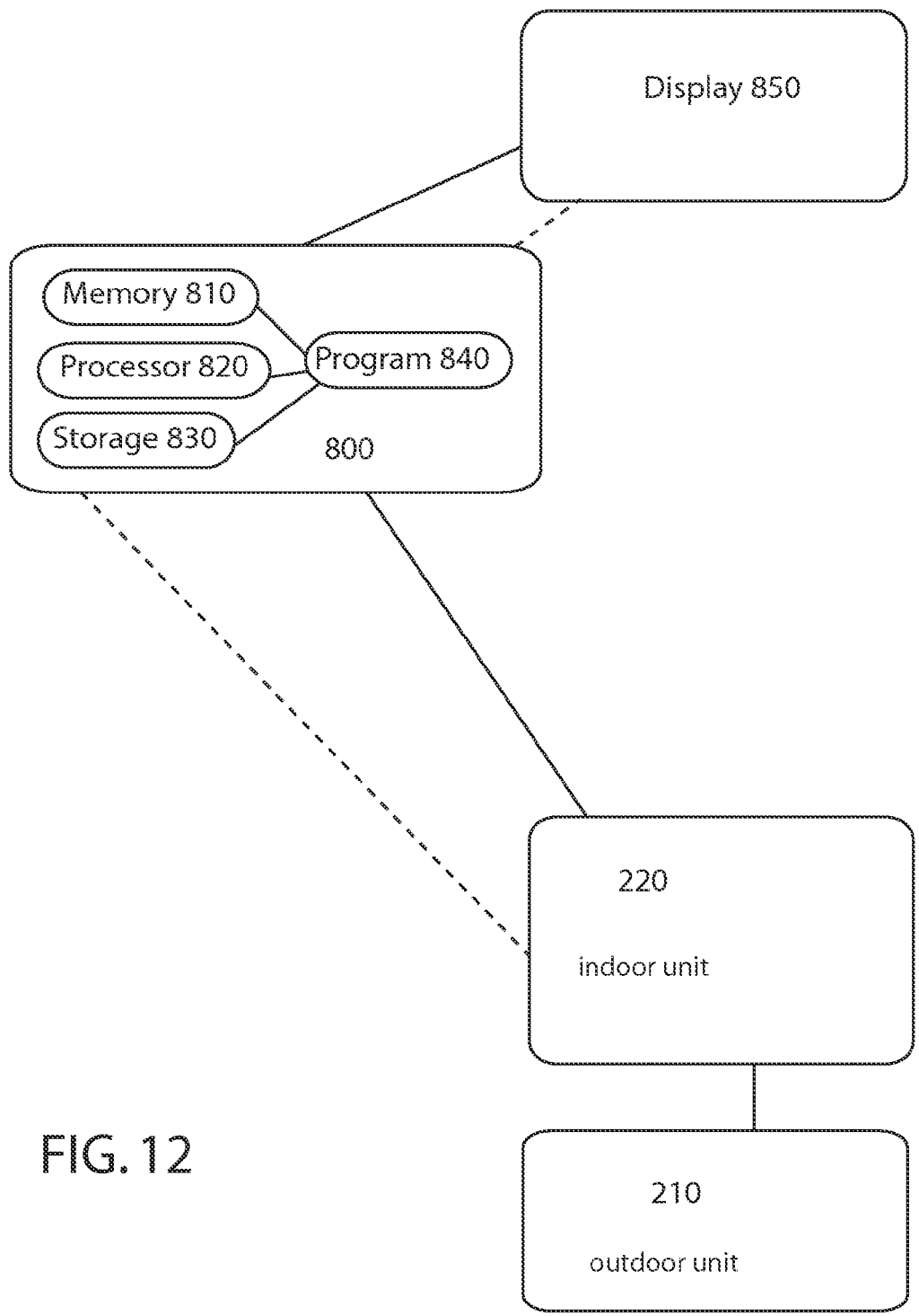
FIG. 12 is a block diagram of a computer system for the presentation of information.

FIG. 12 shows a layout of a pc/server 800 which can be used to create interesting displays of the progress of a race on a racetrack. PC/server 800 can be in the form of any known pc or server and can include a memory device 810 a processor 820, a storage device 830 such as a hard drive and a program 840 which can be in the form of a set of instructions operating on pc/server 800. PC/server 800 receives information from indoor unit 220 relating to the position of each competitor in a race based upon the position of a competitor communication device 10. Program 840 can be used to compile the information received by PC/Server 800 so that it can create graphical images on a display 850.

Figure 13:
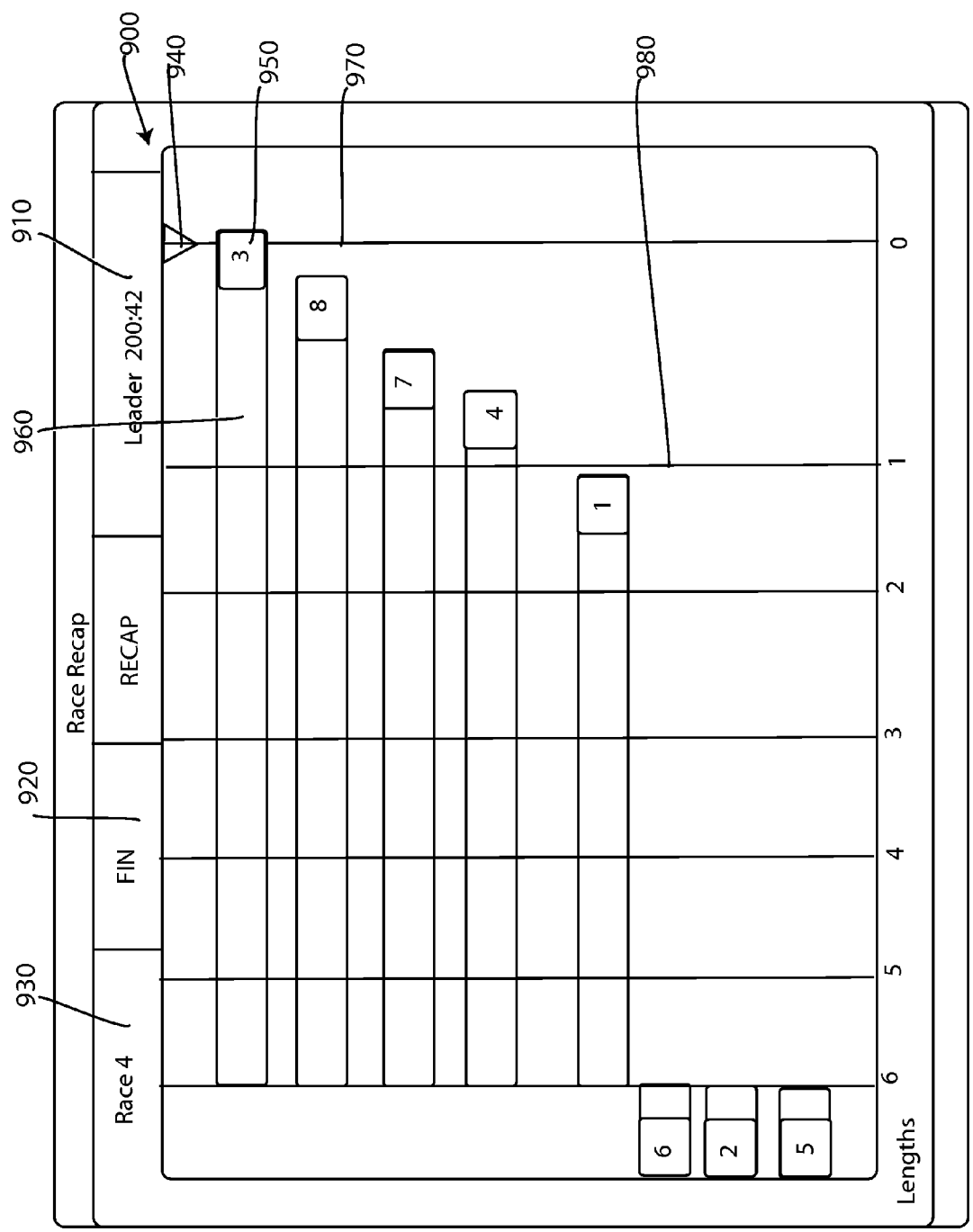
FIG. 13 is a graphical representation which can be used to provide an instant race recap for each fraction and finish.

FIG. 13 shows a screen such as a television based graphical representation or display 900 which can be used to provide an instant race recap for each fraction and finish. In this case, a personal computer (PC) or central server 800 can be in communication with each competitor communication device 10 either directly or via indoor unit 220 and outdoor unit 210 to receive the signals from each competitor communication device. PC/server 800 as shown in FIG. 12 can then be used to create an instant race recap via a video screen. This entire screen is a snapshot representation of all the competitors/CCD positions as a leader crosses a fraction line. (See FIG. 15)

In this case, there is shown a graphical representation of the competitors in a race wherein this representation lists the leader time 910, the name of the fraction represented (¼, ½, ¾, FIN (finish) 920, a listing of the number of the race 930, and a marker 940 indicating the position of a fraction position on a track. Each competitor is represented by its race number 950 and also by a graphical bar 960 which extends across the screen and crosses different length lines 970 which is the finish line, and 980 which is the distance behind the lead horse separated by one horse length. These length lines 980 can be used to display a distance that a competitor is spaced behind another competitor. For example, in horse racing, the distance of other horses behind another horse can be calculated in lengths. In this case, these length lines would be helpful for handicappers in determining the distance that particular competitors are from a leader.

Figure 14:
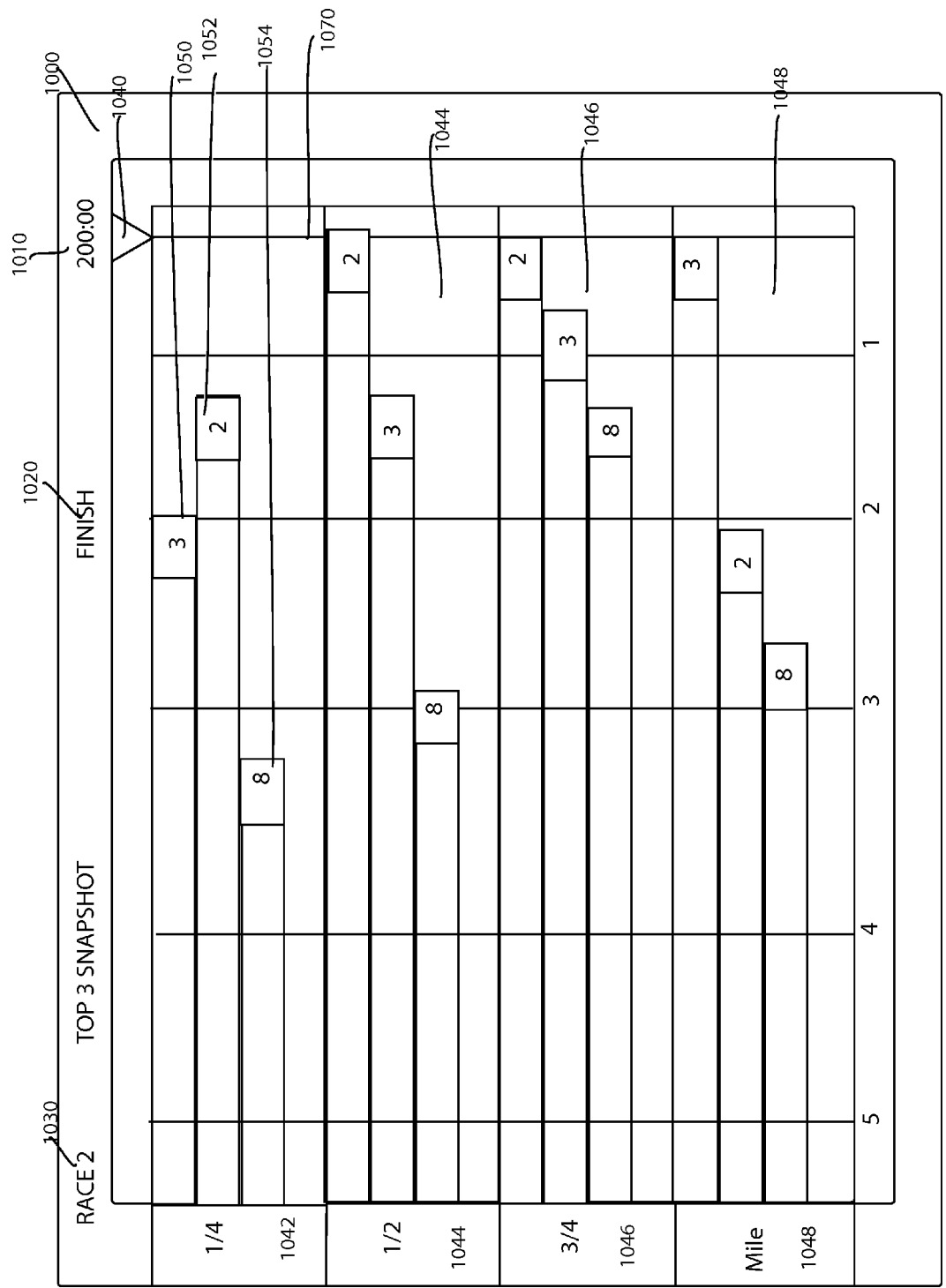
FIG. 14 denotes a television graphical representation of the top three (3) finishers (win, place, show) throughout a race.

FIG. 14 denotes a television graphical representation of the top three (3) finishers (win, place, show) in horse racing throughout an entire race. This screen representation 1000 includes a time clock 1010, an indication of a race number 1030, and a position marker 1040 which marks the position of the leader in a race. In this single race, the positions of the first three competitors 1052, 1050, 1054 are shown for each of the race fraction periods. For example, the position of these competitors are shown at the ¼ mile fraction marker 1042, the ½ mile fraction marker 1044, at the ¾ mile fraction marker 1046, and also at the mile fraction marker 1048. In this case, the position of the three leading competitors are shown to provide an indication of a competitor in a win/place/show position for each position on the track.

Figure 15:
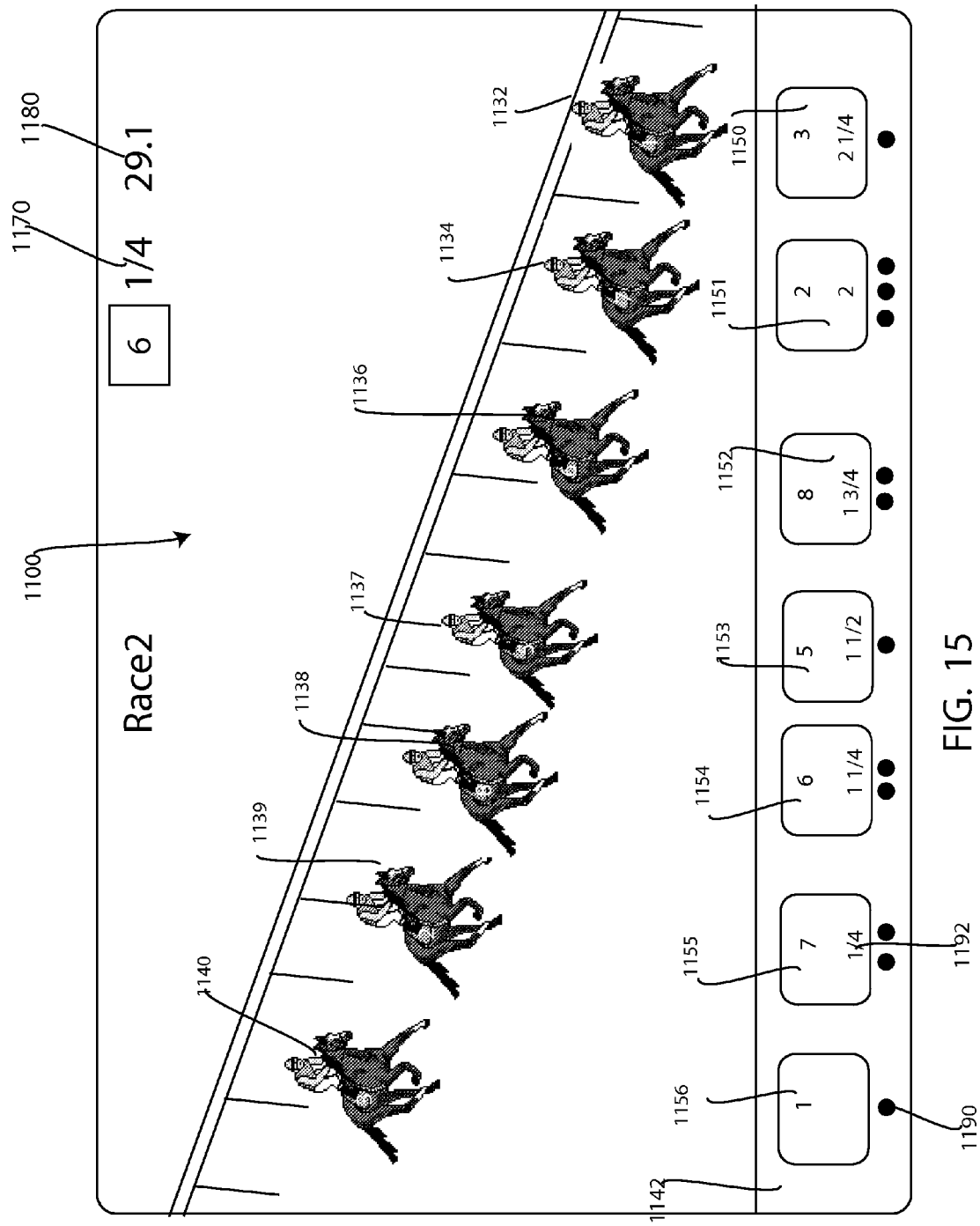
FIG. 15 shows a full field running order television screen which includes the actual live video screen of the race competitors.

FIG. 15 shows a full field running order television screen which includes the actual live video screen of the race competitors and also a listing at the bottom of the screen of the order of all of these competitors in the race which may be more than represented in FIG. 15. This running order is shown by displaying from left to right a graphic of the competitors position in the race. For example, three is a series of competitors 1132, 1134, 1136, 1137, 1138, 1139, and 1140 shown in real time on a video screen. A listing of these competitors is then shown in a graphic bar 1142 which displays the order of these competitors extending from left to right. For example, competitor number 1, designated by number 1132 on the screen is positioned in lower graphic bar 1142 and shown by graphic 1156 and positioned in a far left position indicating that competitor number 1 is in a lead. Competitor number 7 is shown by graphic 1155 and is shown adjacent to graphic 1156. The remaining graphics 1150, 1151, 1152, 1153 and 1154 are used to show the order of these remaining competitors.

This screen also shows an indicator 1160 of the number of the horse in the lead at the previous fraction mark, the indicator for the previous fraction mark 1170, and the time period of the leader at the previous fraction mark 1180. Furthermore, there is also a set of indicators or graphical representation elements 1190 which indicate the placement of the horses via dots to indicate the distance of each horse in an average horse width from the inside rail. Each dot indicates that the horse is an average horse width from the rail. In this case, these indicators on all of the screens indicate both the length position and the width position of these competitors during the race.

With this view, there can also be a set of indicators indicating the length that each horse is spaced from the lead horse. For example, as shown in this view, graphic blocks 1150-1156 include the positioning distances of the horses based upon the distance each horse is from the lead. In this case, the lead horse number 1 is shown by graphic 1156. The horse in second place, horse number 7 is shown as spaced two horse widths from the rail via indicator 1190, and also trailing the leading horse by ¼ of a length as shown by graphic, or graphic representation element 1192. For each trailing horse, these indicators or graphics 1192, would then be used to indicate the position of that horse with respect to the lead horse. The distances by length would be calculated based upon the split times, and the speed of the horses to determine the length of the distance of each horse from the leader. With these graphics 1192, the user can then have a full visual indication of the position of each horse in a race.

Essentially, the competitor communication device 10 works with program 840 and PC/server 800 to create a system where there is an easier way to present instant information to viewers who wish to track and handicap races. The process can essentially follow the following steps: a timer on a competitor communication device is started with an absolute timer clock, the time on that device 10 is marked at the start of the race and then forwarded wirelessly to outdoor unit 210 or directly to a receiving central station 800. If this information is passed first to outdoor unit 210, then this information is then forwarded onto indoor unit 220. Indoor unit can then forward this information onto PC/server 800. This information is then forwarded onto display 800 to display this information on the different screens.

This system them provides a handicapper of races with an easy access to information relating to that race. In this case, the handicapper can then easily use this information to monitor or bet on future races.

Accordingly, while several embodiments of the present invention have been shown and described, it is to be understood that many changes and modifications may be made thereunto without departing from the spirit and scope of the invention as defined in the appended claims.

What is claimed is:

1. A system for determining-a particular position of an individual contestant in a race and a position on a track of that contestant wherein the system comprises:

at least one stationary transmitting directional antenna positioned at a position on one side of the track and for creating and broadcasting an encoded radio signal across the track;

at least one competitor communication device which can be coupled to each contestant and which can be used to read the encoded radio signal;

at least one remote receiving station for receiving at least one transmission from said competitor communication device;

wherein said at least one competitor communication device has at least one processor, and at least one antenna, which is configured to measure a position of a competitor relative to an inside rail of a track, and is configured to determine a position, speed and time of a contestant as that contestant is passing said at least one stationary transmitting directional antenna, by measuring an amplitude, and recording a time of crossing a peak position of the signal, and transmitting a set of captured information comprising said position, speed and time of a contestant, including a position of at least one contestant relative to an inside rail of a track to said remote receiving station.

2. The system as in claim 1, wherein said at least one competitor communication device comprises at least one microprocessor which contains a set of instructions which creates a unique identity for said competitor communication device identifying the contestant using the competitor communication device as a node in a wireless network, and wherein said at least one remote receiving station is configured to determine a position, speed and time of a competitor based upon a slope and amplitude of a signal received from said at least one stationary transmitting directional antenna.

3. The system as in claim 2, further comprising at least one transceiver wherein said microprocessor contains a time division multiple access (TDMA) protocol to set a periodic time for transmission to and from said transceiver to said remote receiving station to avoid collision or interference of a signal.

4. The system as in claim 1, further comprising an infrared beam sensor system positioned adjacent to at least one of said at least one stationary transmitting directional antenna wherein said infrared sensor system's beam is broken when a contestant crosses a path of said infrared beam sensor system to determine the time of a leading contestant.

5. The system as in claim 2, wherein the system is configured to determine a position of a contestant relative to a position of a stationary emitting antenna disposed adjacent to an inside rail on a racetrack by comparing a received signal curve to a pre-calibrated signal curve.

6. The system as in claim 1, wherein said remote receiving station is adapted to read an amplitude amount of a received signal.

7. The system as in claim 1, further comprising at least one antenna adjuster coupled to said at least one stationary transmitting directional antenna, said at least one antenna adjuster being configured to adjust a pointing position of said at least one stationary transmitting directional antenna.

8. The system as in claim 1, further comprising at least one solar power station coupled to said at least one stationary transmitting directional antenna.

9. The system as in claim 1, wherein said at least one competitor communication device is configured to determine a position of a competitor in at least two dimensions comprising a first dimension relative to a position along a length of a track and a second dimension relative to a position relative to an inside rail of a track.

10. A system for charting a position of at least one contestant in a race comprising:
- at least one stationary transmitting directional antenna disposed adjacent to a running surface on a track for broadcasting an encoded radio signal, said at least one stationary transmitting directional antenna being positioned on a side of the track and configured to be aimed to broadcast a signal across the track;
- at least one adjustable antenna bracket, coupled to said at least one stationary transmitting directional antenna, said antenna bracket configured to adjust the aiming position for said at least one stationary transmitting directional antenna;
- at least one competitor communication device which can be coupled to at least one contestant and which can be used to read said encoded radio signal wherein said at least one contestant comprises a plurality of contestants;
- at least one remote base station;
- wherein said competitor communication device determines a position, speed and time as each of said plurality of contestants as said plurality of contestants pass said at least one stationary transmitting directional antenna, and wherein at least one of said plurality of contestant's position, speed and time data is forwarded to said at least one remote base station; and
- at least one display in communication with said at least one remote base station, wherein said at least one display displays the time, speed and position of one contestant of said plurality of contestants in relation to said plurality of contestants and said display includes a graphical representation of a set of top three finishers taken from said plurality of contestants at a plurality of different distance points of call throughout an entire race wherein said display indicates a distance each contestant is spaced from an inside rail of the track during the race.

11. The system as in claim 10, wherein said at least one display is in the form of screen including a graphical representation of a full field running order for each and all the contestants in a race and each contestant's position in relation to at least one other contestant in the race and wherein the distance each competitor is spaced from an inside rail of the track is displayed in terms of an average width of each contestant.

12. The system as in claim 10, wherein said display includes a screen displaying a television based graphical representation which can be used to provide an instant race recap for each fraction and finish position depicting all contestants in the race.

13. The system as in claim 10, further comprising at least one solar power station coupled to said at least one stationary transmitting directional antenna.

14. The system as in claim 10, wherein said at least one competitor communication device is configured to determine a position of a contestant in at least two dimensions comprising a first dimension relative to a position along a length of a track and a second dimension relative to a position relative to an inside rail of a track.

15. A process for setting up a data capture system and recording a live race data stream comprising:
- positioning at least one stationary transmitting directional antenna on a side of a track;
- aiming said stationary transmitting directional antenna across said track;
- broadcasting an encoded radio signal across said track from one side of said track from said stationary transmitting directional antenna;
- attaching at least one individual competitor communication device on at least one contestant, wherein said positioning device is equipped to receive, decode and measure a magnitude of said encoded radio signal on said at least one contestant;
- starting a race;
- recording a position, speed and time of the at least one contestant using said competitor communication device including recording the position of at least one contestant relative to an inside rail on the track;
- reporting said position, speed and time of the at least one contestant on a display device including reporting the position of at least one contestant relative to said inside rail on the track.

16. The process as in claim 15, wherein said step of recording the position, speed and time of the at least one contestant comprises recording the position, speed and time of the at least one contestant relative to an adjacent contestant.

17. The process as in claim 16, wherein said step of recording the position, speed and time of the at least one contestant comprises comparing the position, speed and time of at least one first contestant to at least one second contestant and then recording, reporting and displaying a difference in distance between the first contestant and the second contestant.

18. The process as in claim 17, wherein said step of recording the position, speed and time of the at least one contestant includes recording the position of at least one contestant relative to said inside rail on the track, by reading a received amplitude and comparing said received amplitude to a pre-calibrated amplitude curve of at least one contestant to indicate a distance from the inside rail on the racetrack.

19. The process as in claim 18, wherein said step of recording the position of at least one contestant relative to said inside rail on the track includes measuring the at least one contestant's position based on an average width of a contestant and wherein said step of reporting a position, speed and time, comprises reporting said at least one contestant's position based upon an average width of each contestant.

20. The process as in claim 15, wherein said step of reporting a position of at least one contestant includes reporting on at least one display in a form of a screen including a graphical representation of a full field running order including each and all of the contestants in a race.

21. The process as in claim 15, wherein said step of reporting a position of at least one contestant includes reporting a position of a plurality of contestants on a display which includes forming on said display a graphical representation of a set of top three finishers taken from said plurality of contestants at a plurality of different points of call throughout an entire race.

22. The process as in claim 15, wherein said step of reporting a position includes providing a screen displaying a television based graphical representation which can be used to provide an instant snapshot of an arrival position at every fraction point of call and finish, depicting all contestants in the race.

23. The process as in claim 15, wherein said step of recording a position, speed and time of the at least one contestant comprises recording a peak amplitude of a received signal associated with the at least one contestant.

24. The process as in claim 15, wherein said step of recording a position, speed and time of the at least one contestant comprises recording an amplitude amount of a received signal.

25. The process as in claim 15 further comprising powering said at least one stationary transmitting directional antenna via solar power.

26. The process as in claim 15 wherein said step of recording the position, speed and time of the at least one contestant using said competitor communication device comprises recording a position of a contestant in at least two dimensions comprising a first dimension relative to a position along a length of a track and a second dimension relative to an inside rail of a track.

27. The process as in claim 15, wherein said step of reporting said position, speed and time of the at least one contestant on a display device comprises reporting in at least two dimensions including a first dimension relative to a position along a length of a track and a second dimension comprising reporting the position of at least one contestant relative to an inside rail on a track.

28. A process comprising:
broadcasting an encoded radio signal across a track from one side of a track via a stationary directional transmitting antenna positioned on said side of said track wherein said encoded radio signal includes information relating to a race distance point of call at which said stationary directional transmitting antenna is located;
electronically tracking a time, speed and position of at least two contestants in a race by receiving and decoding said encoded radio signal transmitted by said stationary directional transmitting emitter antenna;
transmitting an additional radio signal from a competitor communication device, wherein said additional radio signal includes information relating to a number of the competitor communication device, as well as information relating to the position of the stationary directional transmitting antenna at which the encoded radio signal was received, along with the position, speed and time of said competitor communication device;
receiving said additional radio signal in a base station;
recording a position, speed and time of each of said at least two contestants including comparing a position of at least one first contestant to a position of at least one second contestant based upon receiving said additional radio signal, obtaining a difference and then comparing the difference to an average length of the at least two contestants and an average width of each contestant and then comparing each position of said at least two contestants to a position of an inside rail on the track; and
reporting said position, speed and time of said at least two contestants on a display device by reporting the position in terms of an average width of at least one contestant relative to the inside rail on the track.

29. The process as in claim 28, wherein said step of recording a position and time of said at least one contestant includes recording a position of at least one contestant relative to said inside rail on the track based upon an amplitude of a received signal.

30. The process as in claim 28, wherein said step of recording a position of said at least two contestants includes recording a position of at least two contestants relative to said inside rail and wherein said position is determined based upon comparing a received amplitude curve of a signal from said transmitted encoded radio signal to a pre-calibrated power curve stored in a memory of the competitor device.

31. The process as in claim 28, wherein said step of reporting a position of at least two contestants includes reporting on at least one display in a form of screen including a graphical representation of a full field running order for each of the contestants in a race.

32. The process as in claim 28, wherein said step of reporting a position of at least two contestants includes reporting a position of a plurality of contestants on a display which includes forming on said display a graphical representation of a set of top three contestants in terms of finishing order, taken from said plurality of contestants at a plurality of different points of call throughout an entire race.

33. The process as in claim 28, wherein said step of reporting a position includes providing a graphical representation which can be used to provide an instant race recap for each fraction point of call and finish position for each contestant.

34. The process as in claim 28, wherein said step of electronically tracking the position, speed and time of at least two contestants includes:
attaching at least one individual contestant positioning device on each of the at least two contestants, wherein said positioning device is equipped to read and decode the encoded radio signal and measure an amplitude of said encoded radio signal.

35. A display for providing information relating to a contestant in a race comprising:
a plurality of graphical representation elements wherein each graphical representation element represents a contestant in a race wherein each contestant is represented by a corresponding graphical representation element,
a race clock representing a race-time of arrival by a lead contestant at each distance point of call and finish during a race; wherein each graphical representation element is arranged in an order on the display to indicate an order of contestants in the race;
wherein each graphical representation element includes a number corresponding to the number of a contestant;
at least one graphical distance indicator indicating a distance that each contestant is positioned in relation to said lead contestant wherein said graphical distance indicator is positioned adjacent to the number corresponding to the number of said contestant and wherein said graphical distance indicator indicates a distance that each contestant is spaced based upon an average length of a contestant and a distance that each contestant is spaced from an inside rail on a track.

36. The display as in claim 35, wherein the display further comprises a video display of all the contestants.

37. The display as in claim 35, further comprising a second set of a plurality of graphical representation elements wherein each element in said second set of elements represents a distance that each associated-contestant is spaced from in relation to a leading contestant in the race.

38. The display as in claim 37, wherein each graphical representation element represents distance as a fraction of a length of a contestant.

* * * * *